United States Patent
Hirota et al.

(10) Patent No.: US 8,682,048 B2
(45) Date of Patent: Mar. 25, 2014

(54) IMAGE PROCESSING DEVICE, IMAGE PROCESSING METHOD, COMPUTER-READABLE RECORDING DEVICE

(75) Inventors: Masashi Hirota, Hachioji (JP); Yamato Kanda, Hino (JP); Makoto Kitamura, Hachioji (JP); Takeshi Kono, Tachikawa (JP)

(73) Assignee: Olympus Corporation, Tokyo (JP)

( * ) Notice: Subject to any disclaimer, the term of this patent is extended or adjusted under 35 U.S.C. 154(b) by 168 days.

(21) Appl. No.: 13/343,796

(22) Filed: Jan. 5, 2012

(65) Prior Publication Data

US 2012/0177259 A1    Jul. 12, 2012

(30) Foreign Application Priority Data

Jan. 11, 2011    (JP) .................................. 2011-002984

(51) Int. Cl.
 *G06K 9/00*    (2006.01)
 *A61B 1/04*    (2006.01)
(52) U.S. Cl.
 USPC .......................... 382/128; 382/199; 600/109
(58) Field of Classification Search
 CPC ..................................................... G06K 9/00
 USPC ......... 382/100, 103, 106, 128–134, 162–168, 382/173, 181, 199, 201, 219, 224, 232, 254, 382/274, 276, 286–291, 305, 312; 600/109; 348/65
 See application file for complete search history.

(56) References Cited

U.S. PATENT DOCUMENTS

| | | | |
|---|---|---|---|
| 2002/0097320 A1* | 7/2002 | Zalis | 348/65 |
| 2004/0184646 A1* | 9/2004 | Oosawa | 382/128 |
| 2008/0292154 A1* | 11/2008 | Nishimura et al. | 382/128 |
| 2009/0306474 A1* | 12/2009 | Wilson | 600/109 |
| 2010/0124365 A1* | 5/2010 | Kanda | 382/128 |

FOREIGN PATENT DOCUMENTS

| | | |
|---|---|---|
| EP | 1 842 481 A1 | 10/2007 |
| EP | 2 294 964 A1 | 3/2011 |
| JP | 2006-166939 | 6/2006 |
| WO | WO 2009/148092 A1 | 12/2009 |

OTHER PUBLICATIONS

European Search Report dated May 21, 2012 from corresponding European Patent Application No. EP 11 01 0280.3.

* cited by examiner

*Primary Examiner* — Seyed Azarian
(74) *Attorney, Agent, or Firm* — Scully, Scott, Murphy & Presser, P.C.

(57) ABSTRACT

In an image processing device that discriminates between a mucosal region and a non-mucosal region that are contained in an intraluminal image, the image processing device includes a residue candidate region detecting unit that detects a residue candidate region to be discriminated whether the candidate region is a mucosal region or not, on the basis of a feature data of each pixel that constitutes the intraluminal image, a structure edge region detecting unit that detects a structure edge contained in the intraluminal image, and an approximate structure edge line calculating unit and an overlap deciding unit that discriminate whether the residue candidate region is a mucosal region or not, based on a relative positional relationship between the structure edge and the residue candidate region.

17 Claims, 20 Drawing Sheets

IMAGE PROCESSING DEVICE, IMAGE PROCESSING METHOD, COMPUTER-READABLE RECORDING DEVICE

CROSS-REFERENCE TO RELATED APPLICATIONS

This application is based upon and claims the benefit of priority from Japanese Patent Application No. 2011-002984, filed on Jan. 11, 2011, the entire contents of which are incorporated herein by reference.

BACKGROUND OF THE INVENTION

1. Field of the Invention

The present invention relates to an image processing device, an image processing method, and a computer-readable recording device for processing an intraluminal image captured by picking up an image within a lumen.

2. Description of the Related Art

Conventionally, an endoscope is widely used as a medical observation device that is introduced into the body of a person being tested such as a patient and that noninvasively observes inside of a lumen. In recent years, a swallow-type endoscope (a capsule endoscope) is also being developed that accommodates an imaging device, a communication device, and the like in a capsule-shape casing and that radio transmits image data captured by the imaging device to outside of the body. A series of images (intraluminal images) captured by the medical observation device reach an enormously large number (more than tens of thousands), and great deal of experience is necessary to observe and diagnose each intraluminal image. Therefore, a medical diagnosis support function that supports diagnosis of a doctor is desired. As one of image recognizing techniques to achieve this function, there is proposed a technique for automatically detecting an abnormal part from an intraluminal image and for indicating an image that needs to be diagnosed selectively.

Meanwhile, to detect an abnormal part by image recognition, as a preprocessing, it is important to extract a mucosal region by removing a region requiring no observation (an unnecessary region) that reflects a residue and the like. In Japanese Patent Application Laid-open No. 2006-166939, for example, an image processing method for detecting presence, in a predetermined region to be processed set for a captured image of biological mucosa, of a specific biological mucosa on the basis of color tone feature data of a pixel is disclosed.

SUMMARY OF THE INVENTION

An image processing device according to an aspect of the present invention that discriminates between a mucosal region and a non-mucosal region that are contained in an intraluminal image includes: a candidate region detecting unit that detects a candidate region to be discriminated whether the region is a mucosal region or not, on the basis of a feature data of each pixel that constitutes the intraluminal image; a structure edge region detecting unit that detects a structure edge contained in the intraluminal image; and a region discriminating unit that discriminates whether the candidate region is a mucosal region or not, on the basis of a relative positional relationship between the structure edge and the candidate region.

An image processing method according to another aspect of the present invention for discriminating between a mucosal region and a non-mucosal region that are contained in an intraluminal image includes: candidate region detecting to detect a candidate region to be discriminated whether the region is a mucosal region or not, on the basis of a feature data of each pixel in the intraluminal image; structure edge detecting to detect a structure edge contained in the intraluminal image; and region discriminating to discriminate whether the candidate region is a mucosal region or not, on the basis of a relative positional relationship between the structure edge and the candidate region.

A computer-readable recording device with an executable program stored thereon, wherein the program instructs a processor to perform: candidate region detecting to detect a candidate region to be discriminated whether the region is a mucosal region or not, on the basis of a feature data of each pixel in the intraluminal image; structure edge detecting to detect a structure edge contained in the intraluminal image; and region discriminating to discriminate whether the candidate region is a mucosal region or not, on the basis of a relative positional relationship between the structure edge and the candidate region.

The above and other features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Image processing devices according to embodiments of the invention are explained below with reference to drawings. The invention is not limited to these embodiments. In the description of the drawings, the same portions are assigned with identical reference symbols.

The image processing devices according to the embodiments explained below process an intraluminal image within the body of a person being tested (within a lumen) captured by a medical observation device such as an endoscope and a capsule endoscope. Specifically, the image processing devices perform a process of discriminating between a mucosal region to be observed (diagnosed) and a non-mucosal region (for example, a residue region) not to be observed, to the intraluminal image. The intraluminal image that is image-processed in the following embodiments is a color image having pixel levels (pixel values) for color components of R (red), G (green), and B (blue) in each pixel.

In the present application, the non-mucosal region means a region other than a mucosa and is displayed overlapped with a mucosal region (at a near side of the mucosal region) on a screen of the intraluminal image. Specifically, the non-mucosal region includes a residue region that is adhered to the mucosa, and a residue region that floats separately from the mucosa (also called a floating residue). In the present application, these residue regions are regarded as unnecessary regions that are not to be observed.

First Embodiment

Figure 1:
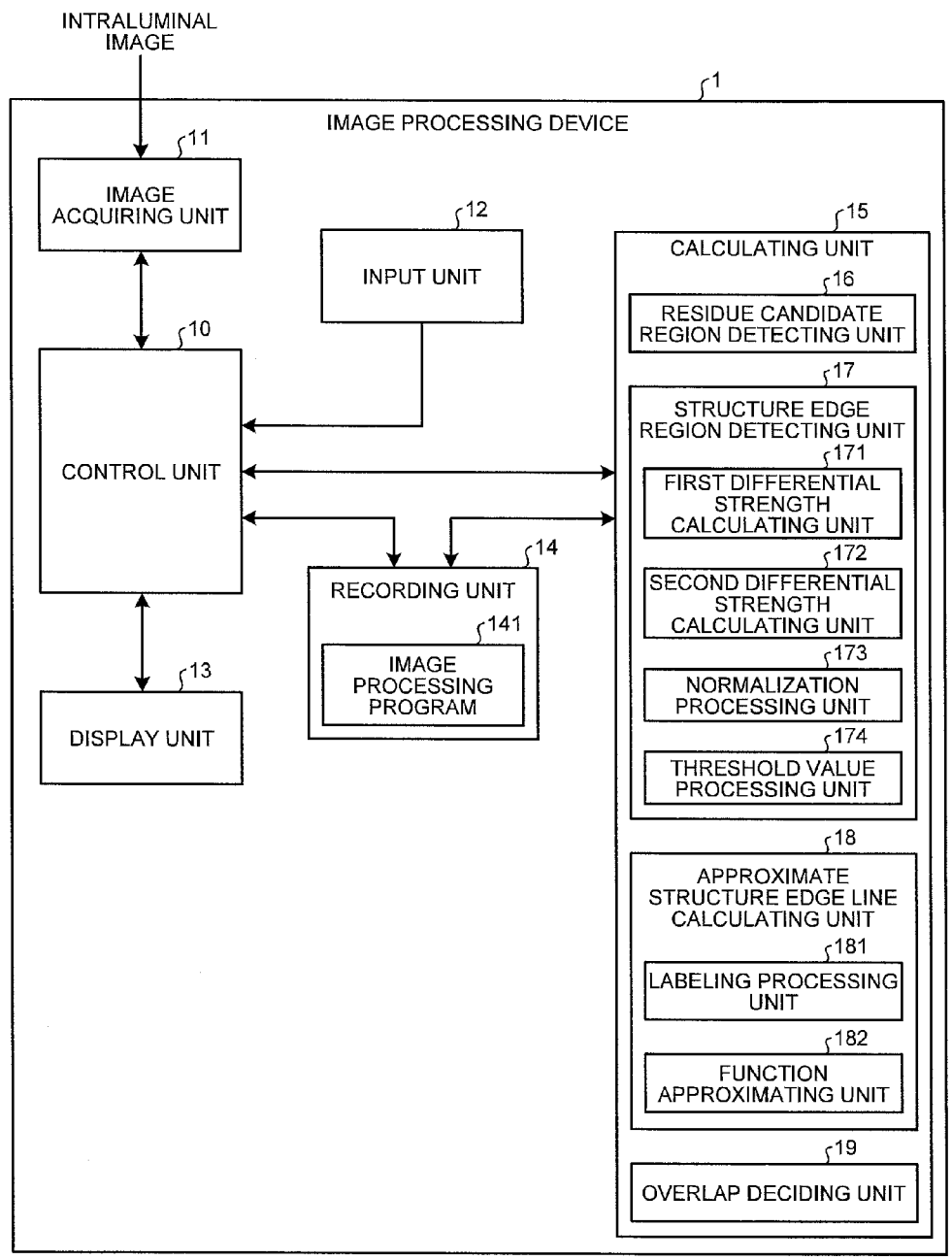
FIG. 1 is a block diagram illustrating a configuration of an image processing device according to a first embodiment of the invention.

FIG. 1 is a block diagram illustrating a configuration of an image processing device according to a first embodiment of the invention. As illustrated in FIG. 1, an image processing device 1 includes a control unit 10 that controls a whole operation of the image processing device 1, an image acquiring unit 11, an input unit 12, a display unit 13, a recording unit 14, and a calculating unit 15.

The image acquiring unit 11 acquires image data of an intraluminal image captured by a medical observation device. The image acquiring unit 11 is suitably configured according to a mode of a system that includes the medical observation device. For example, when the medical observation device is a capsule endoscope and also when a portable recording medium is used to exchange image data with the medical observation device, the image acquiring unit 11 is configured by a reader device that is detachably mounted with the recording medium and that reads the image data of the intraluminal image that is stored. When a server that stores the image data of the intraluminal image captured by the medical observation device is installed, the image acquiring unit 11 is configured by a communication device and the like connected to the server, and acquires the image data of the intraluminal image by performing data communications with the server. Alternatively, the image acquiring unit 11 can be configured by an interface device or the like that inputs the image signal via a cable.

The input unit 12 is realized by a keyboard, a mouse, a touch panel, and various switches, and outputs an input signal to the control unit 10.

The display unit 13 is realized by a display device such as an LCD and an EL display, and displays various screens containing the intraluminal image under the control of the control unit 10.

The recording unit 14 is realized by various IC memories of ROM and RAM such as update recordable flash memory, and an information recording medium such as a CD-ROM and a reading device thereof. The recording unit 14 stores a program for operating the image processing device 1 and causing the image processing device 1 to perform various functions, and data to be used during execution of the programs, in addition to the image data of the intraluminal image acquired by the image acquiring unit 11. Specifically, the recording unit 14 stores an image processing program 141 for identifying a non-mucosal region from the intraluminal image.

The calculating unit 15 is realized by hardware such as a CPU, and performs various calculation processes to identify the non-mucosal region by processing the image data of the intraluminal image, by reading the image processing program 141. The calculating unit 15 has a residue candidate region detecting unit 16, a structure edge region detecting unit 17, an approximate structure edge line calculating unit 18, and an overlap deciding unit 19 as a residue region discriminating unit.

The residue candidate region detecting unit 16 detects a candidate region to be discriminated whether the candidate region is a residue region or not, on the basis of a color feature data. Specifically, the residue candidate region detecting unit 16 first divides the intraluminal image into regions of each similar color, and calculates an R value, a G/R value, B/G value, for each pixel. The residue candidate region detecting unit 16 next calculates an average R value, an average G/R value, and an average B/G value, for each of the divided regions. Next, the residue candidate region detecting unit 16 maps the average R value, the average G/R value, the average B/G value into a feature space consisting of three axes of an R value, a G/R value, a B/G value. The residue candidate region detecting unit 16 detects a candidate region by threshold-value processing these average values in this feature space. A detection method of the candidate region is not limited to the above-explained method. For example, various known methods can be used as far as these methods are for detecting the candidate region on the basis of color feature data by mapping the R value, the G value, and the B value into an HSI color space and for threshold-value processing an H value (a value of a hue).

The structure edge region detecting unit 17 detects a structure edge region contained in the intraluminal image. In the intraluminal image, a structure edge, which is an edge caused by the three-dimensional shape of an object to be captured, due to a trench between mucosae and the like, and a color edge due to a blood vessel area of which light absorption characteristics are different from those of a mucosal surface are present. The structure edge region detecting unit 17 extracts a structure edge within the intraluminal image, on the basis of a relative relationship between differential strengths of each color component. The structure edge region detecting unit 17 has a first differential strength calculating unit 171 that calculates a first differential strength by using a first color component (an R component, for example) of each pixel constituting the intraluminal image, a second differential strength calculating unit 172 that calculates a second differential strength by using a second color component (a G component, for example) of each pixel, a normalization processing unit 173 that normalizes the second differential strength on the basis of a strength ratio between the first and second color components, and a threshold value processing unit 174 that discriminates whether the first differential strength and the normalized second differential strength are equal to or larger than a predetermined value.

The approximate structure edge line calculating unit 18 and the overlap deciding unit 19 as a residue region discriminating unit discriminate whether a residue candidate region is a residue region or not, on the basis of a relative positional relationship between the residue candidate region and a structure edge.

The approximate structure edge line calculating unit 18 calculates an approximate line (an approximate structure edge line) of a detected structure edge. The approximate structure edge line calculating unit 18 includes a labeling processing unit 181 that labels a structure edge that is detected near a residue candidate region (a portion where a part overlaps or is in contact with the residue candidate region, for example), and a function approximating unit 182 that calculates an approximation function for each labeled structure edge.

The overlap deciding unit 19 decides whether the approximate structure edge line overlaps a residue candidate region, and discriminates whether the residue candidate region is a residue region, on the basis of an overlap state of the approximate structure edge line and the residue candidate region.

The control unit 10 is realized by hardware such as a CPU, and performs an instruction and a transfer of data to each unit constituting the image processing device 1, and comprehensively controls the whole operation of the image processing device 1, following image data input from the image acquiring unit 11 and an operation signal input from the input unit 12, by reading various programs stored in the recording unit 14.

Figure 2:
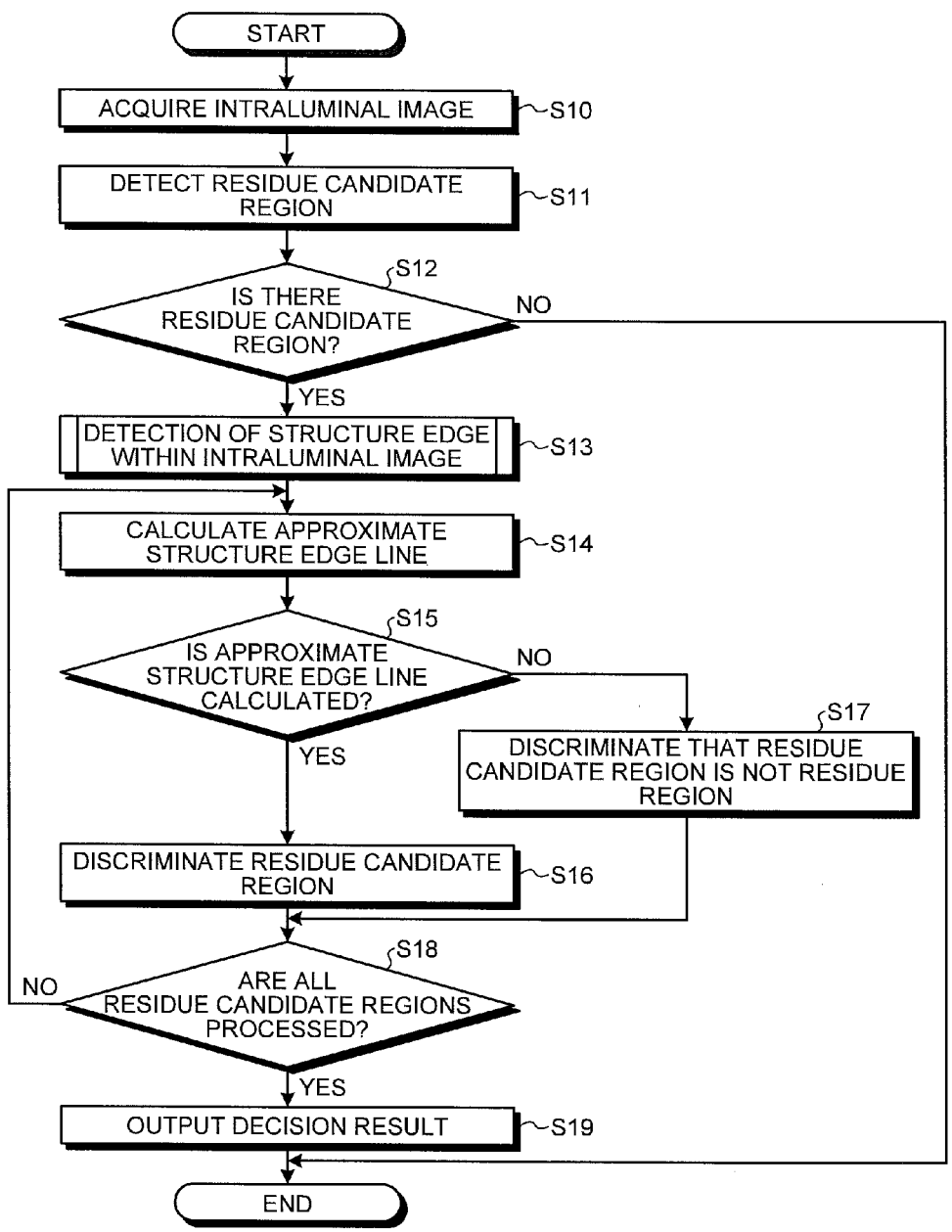
FIG. 2 is a flowchart illustrating an operation of the image processing device illustrated in FIG. 1.
Figure 3:
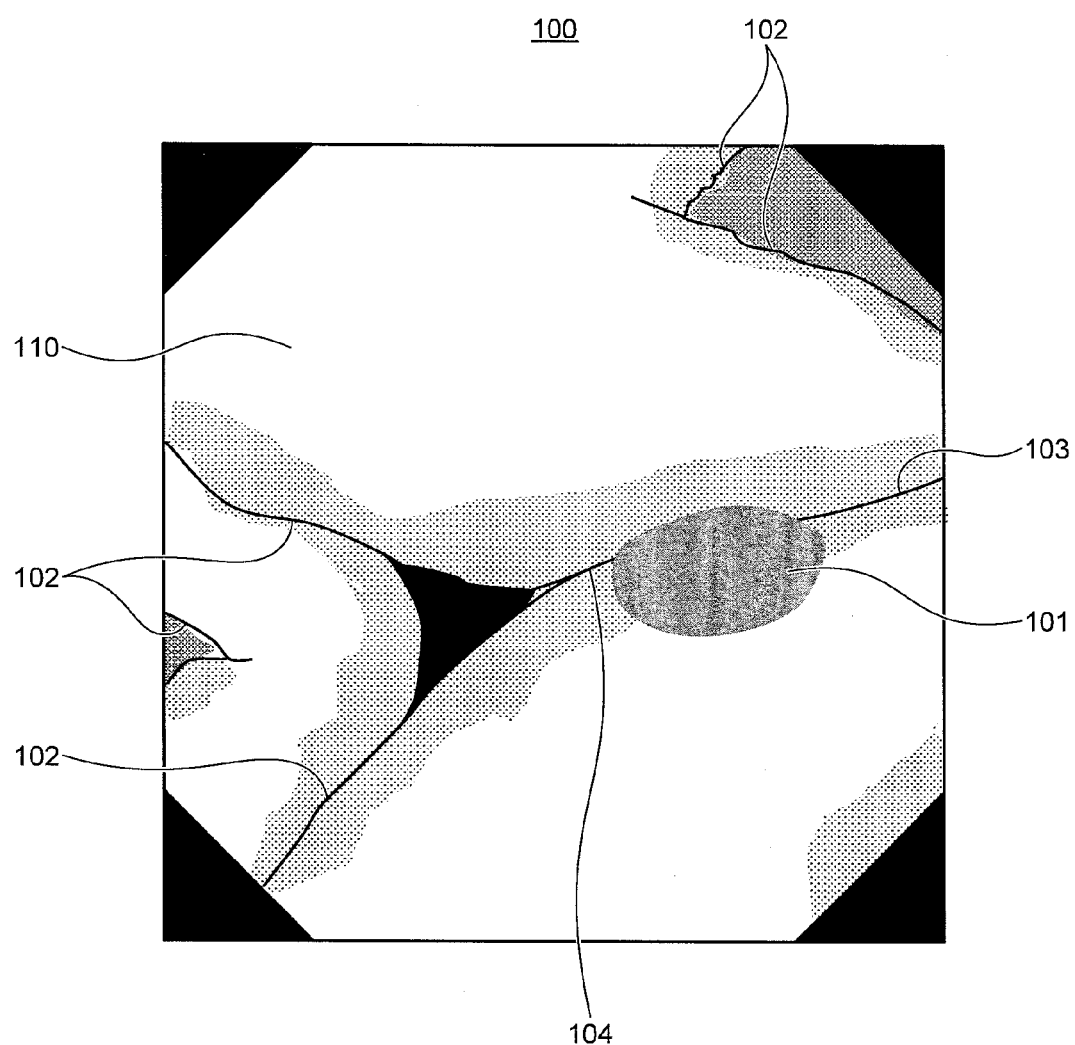
FIG. 3 is a schematic diagram illustrating an example of an intraluminal image.

The operation of the image processing device 1 is explained with reference to FIG. 2 and FIG. 3. FIG. 2 is a flowchart illustrating the operation of the image processing device 1. FIG. 3 is a schematic diagram illustrating an example of an intraluminal image that is captured by a capsule endoscope and is processed by the image processing device 1.

First, at Step S10, the image processing device 1 receives an input of an intraluminal image group from outside, and stores the intraluminal image group in the recording unit 14. The calculating unit 15 reads an intraluminal image 100 to be processed from the recording unit 14 and acquires the intraluminal image 100.

At Step S11, the residue candidate region detecting unit 16 detects a residue candidate region that is to be discriminated whether the residue candidate region is a residue region or not, from the intraluminal image 100, on the basis of a color feature data.

When a residue candidate region 101 is detected (Yes at Step S12), the structure edge region detecting unit 17 next detects a structure edge within the intraluminal image 100 (Step S13). On the other hand, when a residue candidate region is not detected (No at Step S12), it is decided that a residue candidate region is not present, and the operation of the image processing device 1 ends.

At Step S14, the approximate structure edge line calculating unit 18 calculates an approximate structure edge line of structure edges 103, 104 around the residue candidate region 101, out of the structure edges 102 to 104 that are detected. More specifically, first, the labeling processing unit 181 labels the structure edges 103, 104 near the residue candidate region 101. Next, the function approximating unit 182 calculates an approximate structure edge line, by a function approximating method, on the basis of coordinates of pixels (structure edge pixels) that constitute the labeled structure edges 103, 104. For the function approximating method, known various methods are used such as a linear function and a quadratic function using the method of least squares, for example.

Figure 5:
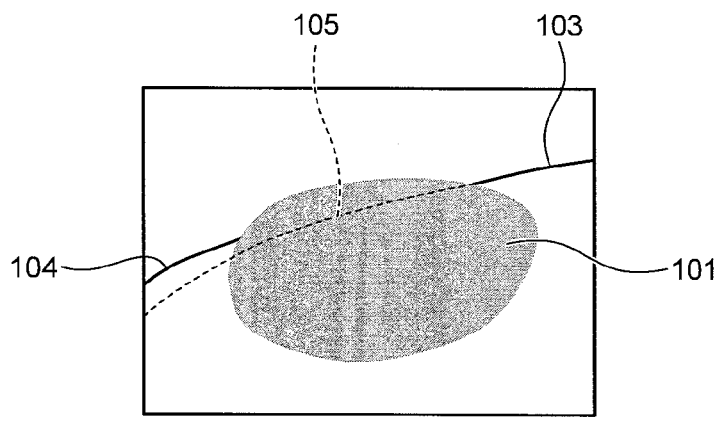
FIG. 5 is a view illustrating a positional relationship between a residue candidate region and an approximate structure edge line.

FIG. 5 is an enlarged view near the residue candidate region 101 illustrated in FIG. 3. For example, when an approximate structure edge line 105 approximate to the structure edge 103 is calculated as illustrated in FIG. 5, for example (Yes at Step S15), the overlap deciding unit 19 discriminates whether the residue candidate region 101 is a residue region, on the basis of a positional relationship between the residue candidate region 101 and the approximate structure edge line 105 (Step S16).

Specifically, the overlap deciding unit 19 scans the inside of the residue candidate region 101, and detects a pixel that is present on the coordinates of the approximate structure edge line 105. When a pixel on the coordinates of the approximate structure edge line 105 is present, the overlap deciding unit 19 decides that the approximate structure edge line 105 and the residue candidate region 101 overlap each other, and discriminates that the residue candidate region 101 is a residue region that shields the structure edge 103.

On the other hand, when a pixel on the coordinates of the approximate structure edge line 105 is not present, the overlap deciding unit 19 decides that the approximate structure edge line 105 and the residue candidate region 101 do not overlap each other, and discriminates that the residue candidate region 101 is not a residue region (that is, a mucosal region).

When an approximate structure edge line is not calculated (No at Step S15), the overlap deciding unit 19 discriminates that the residue candidate region 101 is not a residue region (Step S17).

Thereafter, when a residue candidate region that is not performed with a discrimination process is still present (No at Step S18), the operation shifts to Step S14, and a process to the next residue candidate region is performed. On the other hand, when a discrimination process is performed to all residue candidate regions that are detected from the intraluminal image 100 (Yes at Step S18), the calculating unit 15 outputs a discrimination result, and causes the display unit 13 to display the discrimination result, and causes the recording unit 14 to record the discrimination result (Step S19).

Figure 4:
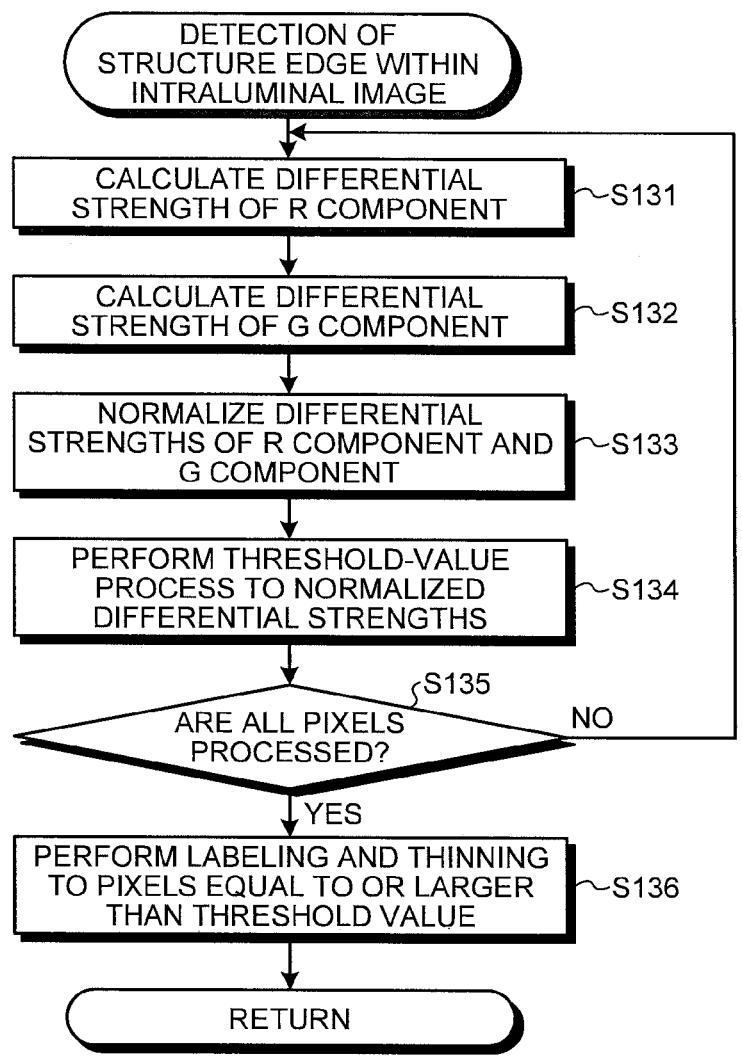
FIG. 4 is a flowchart illustrating a detection process of a structure edge within the intraluminal image.

Next, a detection process of a structure edge described at Step S13 in FIG. 2 is explained in detail with reference to FIG. 4. FIG. 4 is a flowchart illustrating an operation of the structure edge region detecting unit 17 at Step S13.

First, at Step S131, the first differential strength calculating unit 171 calculates a differential strength of the R component by a first differential process using a Sobel filter or the like, for example, for a pixel that constitutes the intraluminal image 100. At Step S132, the second differential strength calculating unit 172 similarly calculates a differential strength of the G component, for the same pixel.

At Step S133, the normalization processing unit 173 normalizes the differential strengths of the R component and the G component, on the basis of a strength ratio between the R component and the G component. The above process is performed for the following reason. In general, strengths of the color components (R, G, B) of each pixel constituting the intraluminal image are in the order of the R value>the G value>the B value, and the differential strength of the R component tends to become higher than the differential strength of the G component. Therefore, the differential strength of the G component is caused to match with the differential strength of the R component by the above process. In the first embodiment, the differential strengths are normalized by multiplying the differential strength of the G component by a strength ratio of the R component to the G component.

At subsequent Step S134, the threshold value processing unit 174 performs a threshold value process to the normalized differential strengths. For example, in a color edge region such as a boundary of a blood vessel region, because a differential strength of the R component becomes low and a differential strength of the G component becomes high, a difference between the differential strengths occurs in each color component. On the other hand, in a structure edge region, because both the R component and the G component change in the same tendency, a large difference does not occur in the differential strengths of each color component. Therefore, the threshold value processing unit 174 extracts pixels in which the differential strengths of both the R component and the G component are equal to or higher than a threshold value, as structure edge pixels.

The structure edge region detecting unit 17 repeats the above processes to all pixels within the intraluminal image 100 (No at Step S135, Step S131).

After the threshold value process is performed to all pixels within the intraluminal image 100 (Yes at Step S135), the structure edge region detecting unit 17 labels the extracted structure edge pixels, and further performs a line-thinning process (see Digital Image Processing, pp. 185-190, CG-ARTS Society) (Step S136). As a result, the structure edges 102 to 104 as illustrated in FIG. 3 are detected. Thereafter, the operation returns to a main routine.

As explained above, in the first embodiment, a residue candidate region is detected on the basis of a color feature data, and whether the residue candidate region is a residue region or not is discriminated on the basis of a relative positional relationship between the residue candidate region and a structure edge (that is, whether the residue candidate region shields the structure edge). Therefore, a residue region can be extracted in higher precision than that of specifying a residue region by using only a color feature data. Accordingly, efficiency of interpretation of radiogram can be improved by excluding an extracted residue region from the intraluminal image in advance as an unnecessary region.

Modification 1-1

As a detection method of a structure edge, various known methods can be used in addition to the above-described detection method based on differential strengths of the first and second color components. For example, a structure edge can be also detected by using a differential strength of at least one color component. Specifically, a color component that is farthest from a light absorption zone in the lumen (the R component out of R, G, B) can be used. The R component has the largest wavelength among the three color components, and has a small light absorption component due to blood (hemoglobin). Therefore, information that best reflects a surface structure of a body tissue can be obtained. In this case, the edge strength of the R component of each pixel is calculated by a known edge extraction technique such as a first differential process using a Sobel filter and a second differential process using Laplacian.

Modification 1-2

Figure 6A:
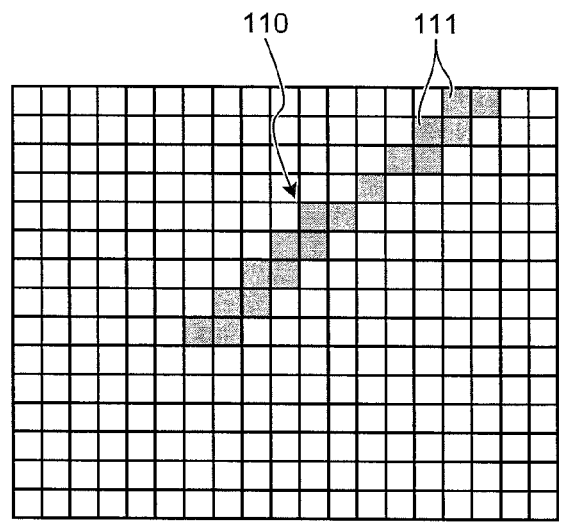
FIG. 6A to FIG. 6C are views illustrating an example of a calculation method of an approximate structure edge line.
Figure 6B:
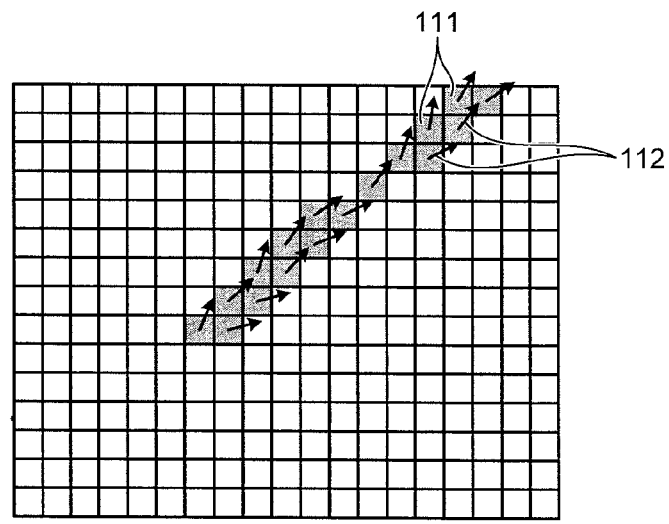
Figure 6C:
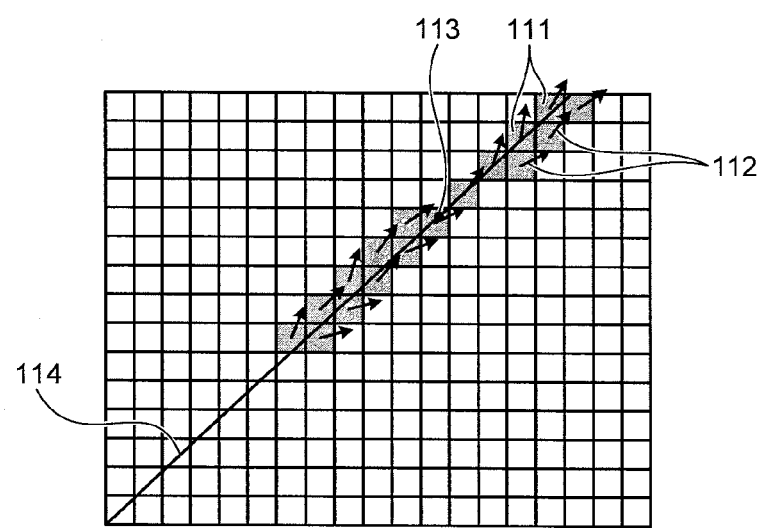

As a calculation method of an approximate structure edge line, various known methods can be used in addition to the above-described method based on function approximation. As an example, a method of calculating an approximate structure edge line from a structure edge pixel 111 constituting a labeled structure edge 110 as illustrated in FIG. 6A is explained. First, the function approximating unit 182 acquires a gradient direction of each structure edge pixel 111 by applying the Sobel filter to each structure edge pixel 111 in the x direction and the y direction. Next, the function approximating unit 182 calculates a vector (an orthogonal vector) 112 that is orthogonal to the gradient direction of each structure edge pixel 111, as illustrated in FIG. 6B. Further, the function approximating unit 182 calculates an average value (an average orthogonal vector) of the orthogonal vectors 112, and a barycenter position 113 of all the structure edge pixels 111 that constitute the structure edge 110. Then, the function approximating unit 182 sets a primary function that has the same inclination as that of the average orthogonal vector and that passes the barycenter position 113, as an approximate structure edge line 114 as illustrated in FIG. 6C.

Modification 1-3

Another example of a calculation method of an approximate structure edge line is explained. First, the function approximating unit 182 obtains a Hessian matrix in each structure edge pixel 111 (coordinates (x, y)) that constitutes the labeled structure edge 110 illustrated in FIG. 6A. Here, the Hessian matrix is a square matrix that has second order partial differentiations of a multivariable scalar function (a pixel value f(x, y) in the modification 1-3) as elements. A second eigenvector of the Hessian matrix faces a direction along a valley or a ridge when the pixel value f(x, y) is regarded as a height (that is, the same direction as that of the orthogonal vector 112 illustrated in FIG. 6B). The function approximating unit 182 calculates an average vector of a second eigenvector of the Hessian matrix of each structure edge pixel 111 and the barycenter position 113 of the structure edge 110 to calculate a primary function that passes the barycenter position 113 and has the same inclination as that of the average vector, and sets this as an approximate structure edge line.

Second Embodiment

Figure 7:
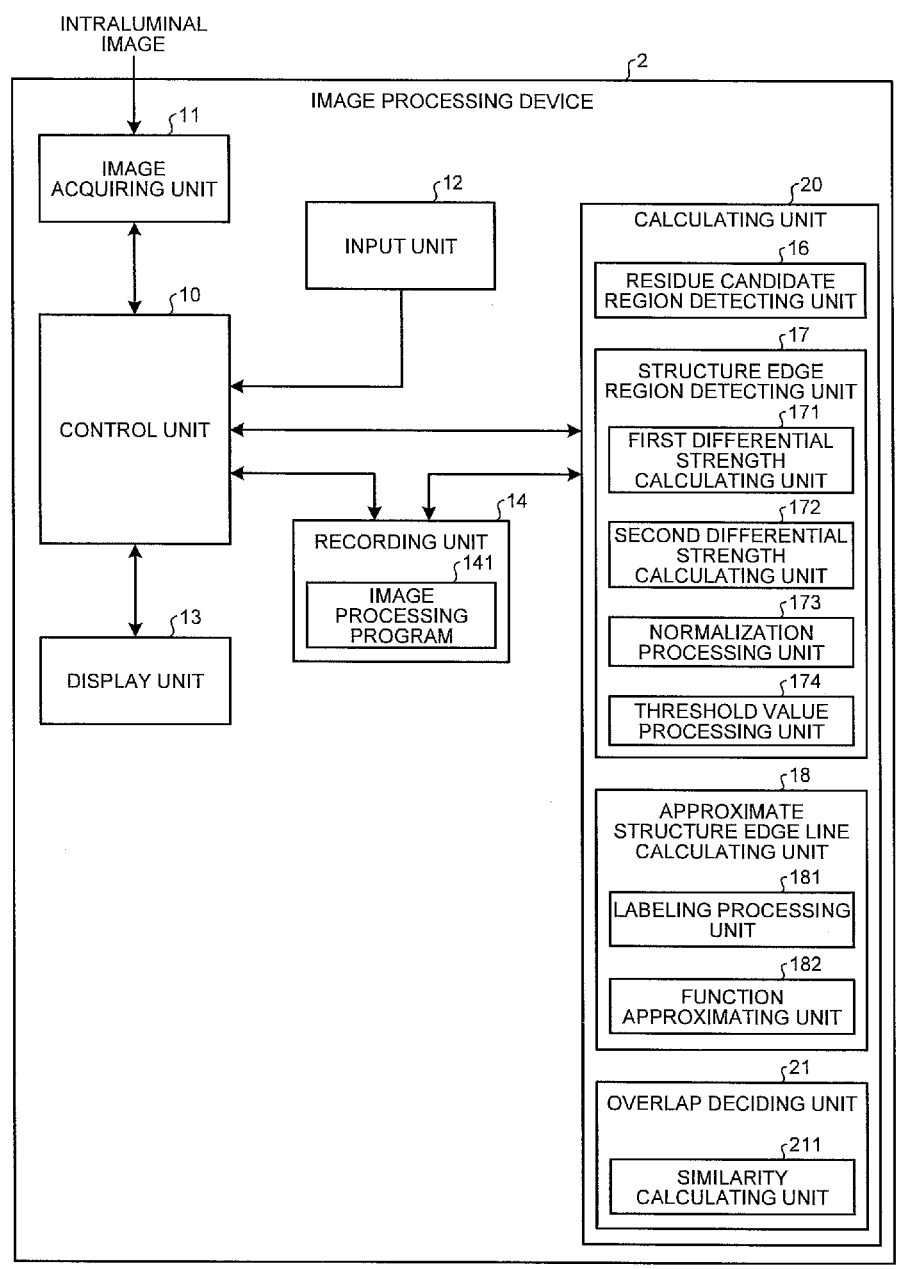
FIG. 7 is a block diagram illustrating a configuration of an image processing device according to a second embodiment of the invention.

An image processing device according to a second embodiment of the invention is explained. As illustrated in FIG. 7, an image processing device 2 according to the second embodiment includes a calculating unit 20. Other configurations are similar to those in FIG. 1.

The calculating unit 20 includes the residue candidate region detecting unit 16, the structure edge region detecting unit 17, the approximate structure edge line calculating unit 18, and an overlap deciding unit 21 as a residue region discriminating unit. Among these units, configurations and operations of the residue candidate region detecting unit 16, the structure edge region detecting unit 17, and the approximate structure edge line calculating unit 18 are similar to those explained in the first embodiment.

The overlap deciding unit 21 includes a similarity calculating unit 211 that calculates a similarity between an approximate structure edge line and an outline of a residue candidate region, decides an overlap relationship between the approximate structure edge line and the residue candidate region on the basis of the calculated similarity, and further discriminates whether the residue candidate region is a residue region, on the basis of a result of this decision.

An operation of the image processing device 2 is explained with reference to FIG. 2, FIG. 8 and FIG. 9. The operation of the image processing device 2 is similar to that illustrated in FIG. 2 as a whole, and is different in a detailed operation of the discrimination process of a residue candidate region described at Step S16.

Figure 8:
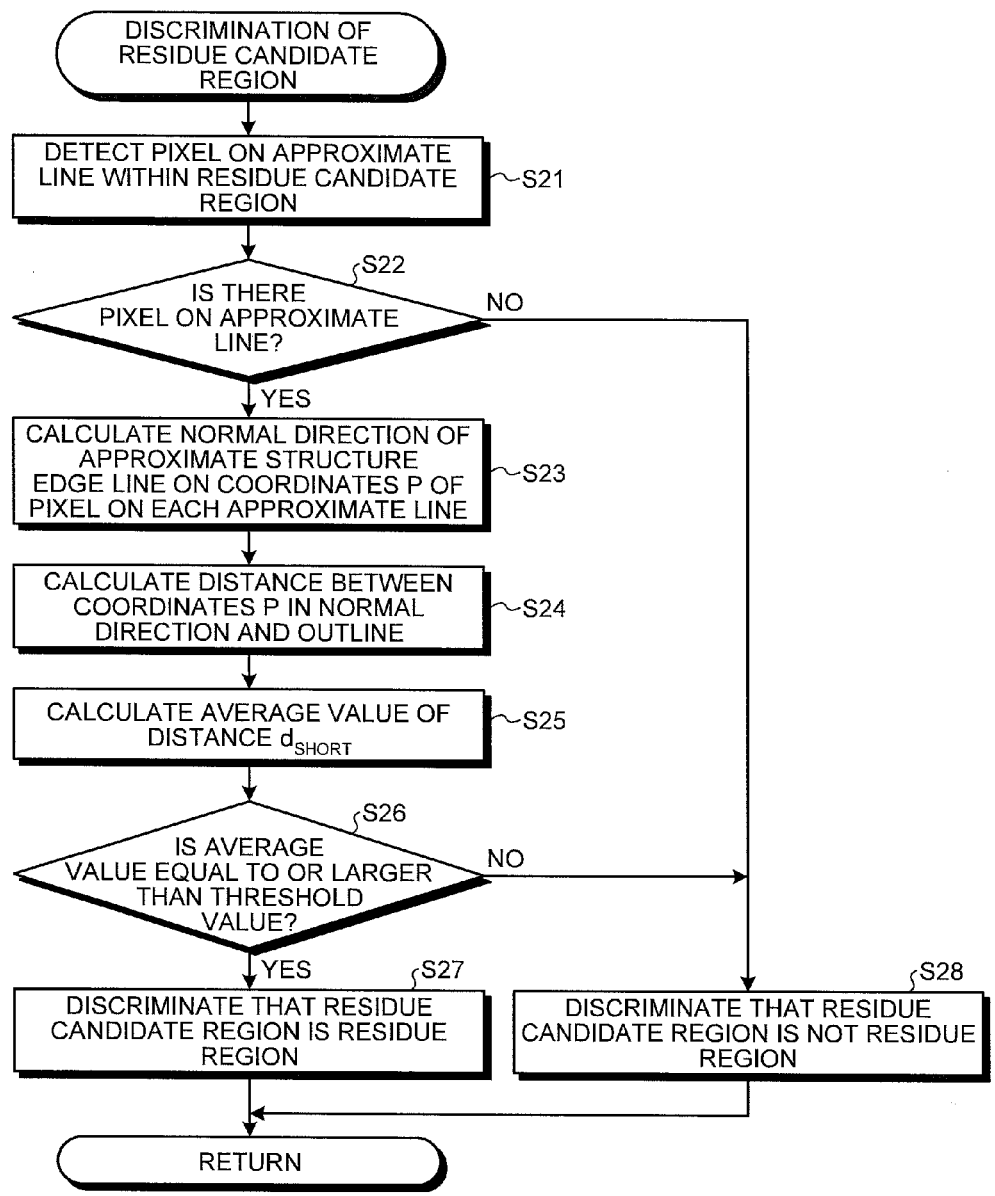
FIG. 8 is a flowchart illustrating a discrimination process of a residue candidate region that the image processing device illustrated in FIG. 7 performs.
Figure 9:
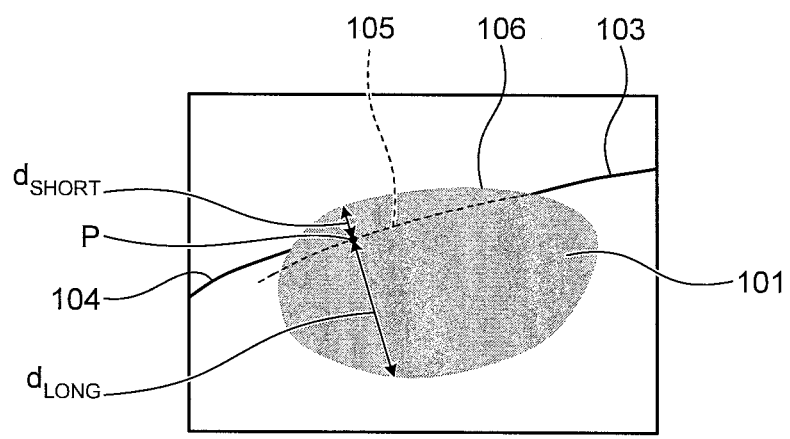
FIG. 9 is a view explaining a method of deciding an overlap state of an approximate structure edge line and a residue candidate region.

FIG. 8 is a flowchart illustrating a discrimination process of a residue candidate region that the image processing device 2 performs. FIG. 9 is a view explaining a method of deciding an overlap state of an approximate structure edge line and a residue candidate region, and illustrates an enlarged view of the residue candidate region 101, the structure edges 103, 104, and the approximate structure edge line 105 that are detected from the intraluminal image 100.

At Step S21, the overlap deciding unit 21 scans the inside of the residue candidate region 101, and extracts a pixel (hereinafter, "pixel on an approximate line") present on coordinates of the approximate structure edge line 105.

When a pixel on an approximate line is present, the structure edge 103 is considered to be in a state of being shielded by the residue candidate region 101. In this case, a region that shields the structure edge 103 has a possibility of being a residue region, or a region that has been detected as a residue candidate region from a color feature data despite of being a mucosal region, e.g., a white lesion region. Such a white lesion region is sometimes more bulged than peripheral mucosal regions, and therefore, has a possibility that the white lesion region appears to be shielding the structure edge 103, depending on a direction of imaging. However, the region that appears to be shielding the structure edge by a bulge of the mucosal region strides the structure edge only slightly. Thus, an outline of such shielding region is present near the structure edge. Therefore, in the second embodiment, it is decided whether the residue candidate region 101 is a residue region, or whether this is a mucosal region that appears to be shielding the structure edge 103 by a bulge, on the basis of a similarity between the approximate structure edge line 105 and an outline 106 of the residue candidate region 101.

When a pixel on an approximate line is detected at Step S22 (Yes at Step S22), the similarity calculating unit 211 calculates a normal direction of the approximate structure edge line 105 at coordinates P of each pixel on an approximate line (Step S23). Further, the similarity calculating unit 211 calculates a distance between the coordinates P and the outline 106 in the normal direction (Step S24). Because the normal line has two directions, two values of a distance $d_{SHORT}$ and a distance $d_{LONG}$ are calculated. The similarity calculating unit 211 adopts the distance $d_{SHORT}$ that is shorter (that is, a distance nearer to the outline 106).

At Step S25, the similarity calculating unit 211 calculates an average value $d_{AVE}$ from the distance $d_{SHORT}$ calculated for all pixels that are detected at Step S21.

At Step S26, the overlap deciding unit 21 decides whether the average value $d_{AVE}$ is equal to or larger than a predetermined threshold value. When the average value $d_{AVE}$ is equal to or larger than a predetermined threshold value (Yes at Step S26), the overlap deciding unit 21 determines that the approximate structure edge line 105 and the outline 106 are not similar, and that the residue candidate region 101 is a residue region (Step S27). Thereafter, the operation returns to a main routine.

On the other hand, when the average value $d_{AVE}$ is smaller than a predetermined threshold value (No at Step S26), the overlap deciding unit 21 decides that the approximate structure edge line 105 and the outline 106 are similar, and that the residue candidate region 101 is not a residue region (Step S28). When a pixel that is present on the approximate structure edge line 105 is not detected at Step S22, the overlap deciding unit 21 also decides that the residue candidate region 101 is not a residue region (Step S28).

As explained above, according to the second embodiment, a category of a residue candidate region is decided on the basis of a similarity between an approximate structure edge line and an outline of the residue candidate region. Therefore, a mucosal region that is extracted from a color feature data as a residue candidate region and that shields a structure edge can be distinguished from a residue region. Accordingly, only a residue region can be accurately extracted from the intraluminal image.

Third Embodiment

Figure 10:
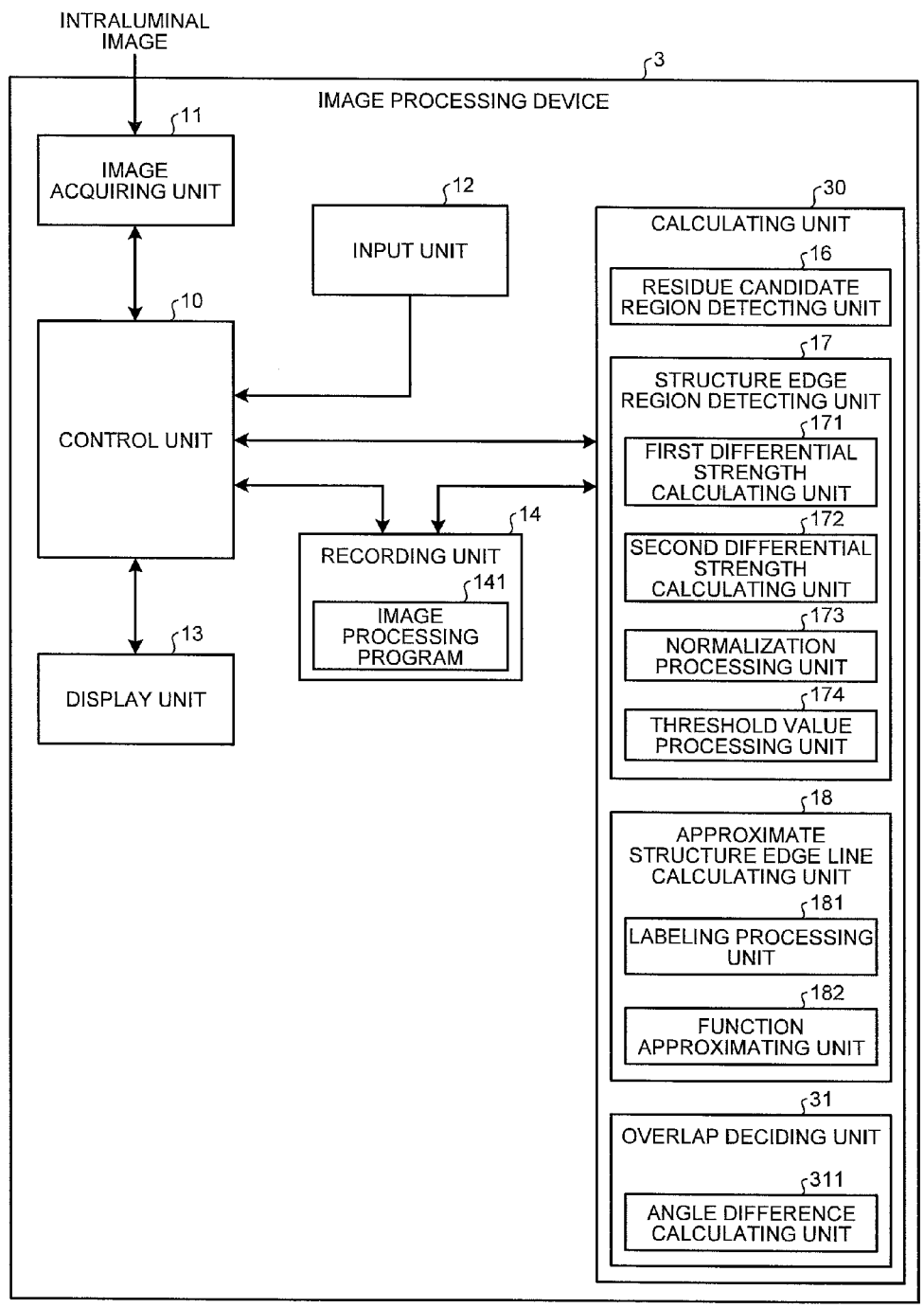
FIG. 10 is a block diagram illustrating a configuration of an image processing device according to a third embodiment of the invention.

An image processing device according to a third embodiment is explained next. As illustrated in FIG. 10, an image processing device 3 according to the third embodiment includes a calculating unit 30. Other configurations are similar to those illustrated in FIG. 1.

The calculating unit 30 includes the residue candidate region detecting unit 16, the structure edge region detecting unit 17, the approximate structure edge line calculating unit 18, and an overlap deciding unit 31 as a residue region discriminating unit. Among these units, configurations and operations of the residue candidate region detecting unit 16, the structure edge region detecting unit 17, and the approximate structure edge line calculating unit 18 are similar to those explained in the first embodiment.

The overlap deciding unit 31 includes an angle difference calculating unit 311 that calculates an angle difference between an approximate structure edge line and an outline of a residue candidate region, decides an overlap relationship between the approximate structure edge line and the residue candidate region on the basis of the calculated angle difference, and further discriminates whether the residue candidate region is a residue region, on the basis of a result of this decision.

An operation of the image processing device 3 is explained with reference to FIG. 2, FIG. 11 and FIG. 12. The operation of the image processing device 3 is similar to that illustrated in FIG. 2 as a whole, and is different in a detailed operation of the discrimination process of a residue candidate region described at Step S16.

Figure 11:
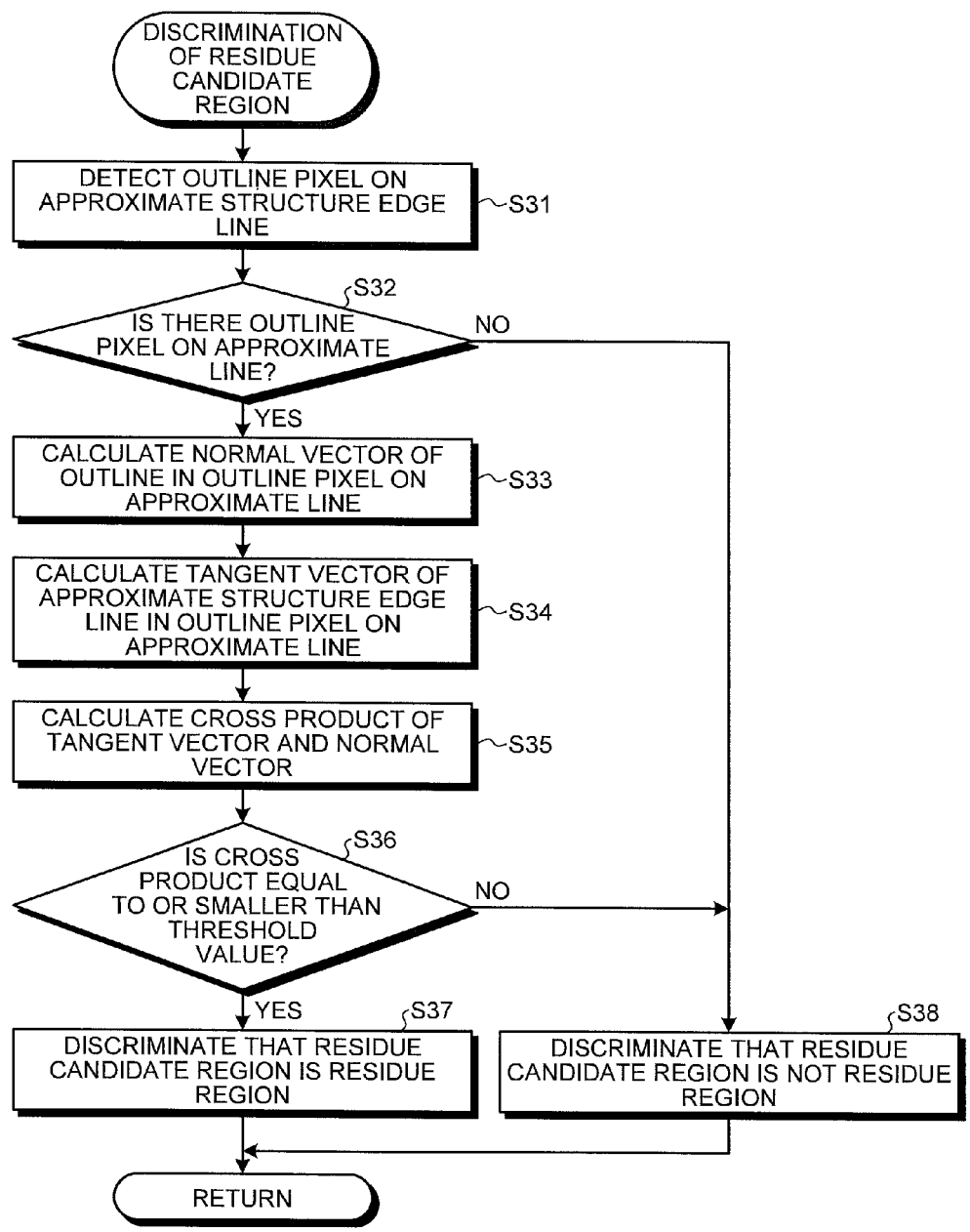
FIG. 11 is a flowchart illustrating a discrimination process of a residue candidate region that the image processing device illustrated in FIG. 10 performs.
Figure 12:
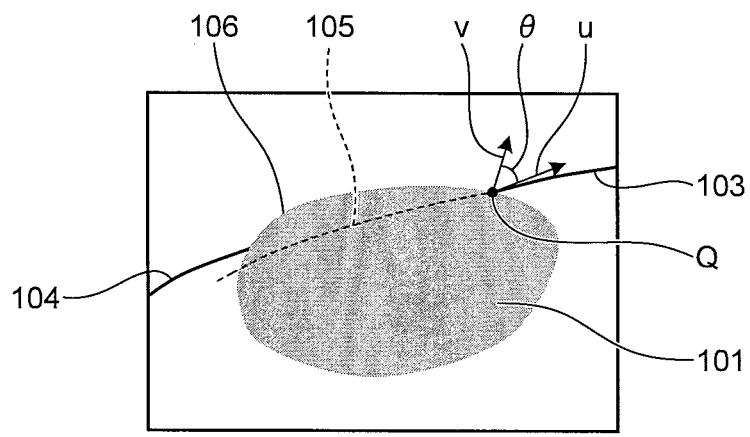
FIG. 12 is a view explaining a method of deciding an overlap state of an approximate structure edge line and a residue candidate region.

FIG. 11 is a flowchart illustrating a discrimination process of a residue candidate region that the image processing device 3 performs. FIG. 12 is a view explaining a method of deciding an overlap state of an approximate structure edge line and a residue candidate region, and illustrates an enlarged view of the residue candidate region 101, the structure edges 103, 104, and the approximate structure edge line 105 that are detected from the intraluminal image 100.

At Step S31, the overlap deciding unit 31 detects an outline pixel (hereinafter, "outline pixel on an approximate line") of which coordinates match those of the approximate structure edge line 105, by performing contour tracing with respect to an outline of residue candidate region 101 (see Digital Image Processing, pp. 178-179, CG-ARTS Society).

When an outline pixel on an approximate line is detected (Yes at Step S32), the angle difference calculating unit 311 calculates a normal vector v of the outline 106 of the residue candidate region 101 at coordinates Q of the outline pixel on an approximate line (Step S33), and also calculates a tangent vector u of the approximate structure edge line 105 at the same coordinates Q (Step S34).

Further, at Step S35, the angle difference calculating unit 311 calculates a value |u×v|=|u|·|v|·sin θ of a cross product of a tangent vector u and a normal vector v. The value |u×v| of the cross product changes according to an angle θ (0≤θ≤180°) that is formed by the tangent vector u and the normal vector v. That is, the value |u×v| of cross product represents a similarity relationship between a direction of the approximate structure edge line 105 and a direction of the outline 106. That is, when the value |u×v| of the cross product is large (for example, sin θ=1, θ=90°), the approximate structure edge line 105 and the outline 106 become in an overlap relationship that their directions are similar. On the other hand, when the value |u×v| of the cross product is small (for example, sin θ=0, θ=0°), the approximate structure edge line 105 and the outline 106 become in an overlap relationship that their directions are not similar.

At Step S36, the overlap deciding unit 31 decides whether a calculated value |u×v| of the cross product is equal to or smaller than a predetermined threshold value. When the value |u×v| of the cross product is equal to or smaller than a predetermined threshold value (Yes at Step S36), the overlap deciding unit 31 discriminates that the approximate structure edge line 105 and the outline 106 are not similar, and that the residue candidate region 101 is a residue region (Step S37). Thereafter, the operation returns to a main routine.

On the other hand, when the value |u×v| of the cross product is larger than a predetermined threshold value (No at Step S36), the overlap deciding unit 31 decides that the approximate structure edge line 105 and the outline 106 are similar, and that the residue candidate region 101 is not a residue region (Step S38). When an outline pixel on an approximate line is not detected at Step S32 (No at Step S32), the overlap deciding unit 31 also decides that the residue candidate region 101 is not a residue region (Step S38).

As explained above, according to the third embodiment, because a vector is used in an outline pixel on an approximate line, an overlap relationship between an approximate structure edge line and an outline of a residue candidate region can be decided by a smaller amount of calculation.

Fourth Embodiment

Figure 13:
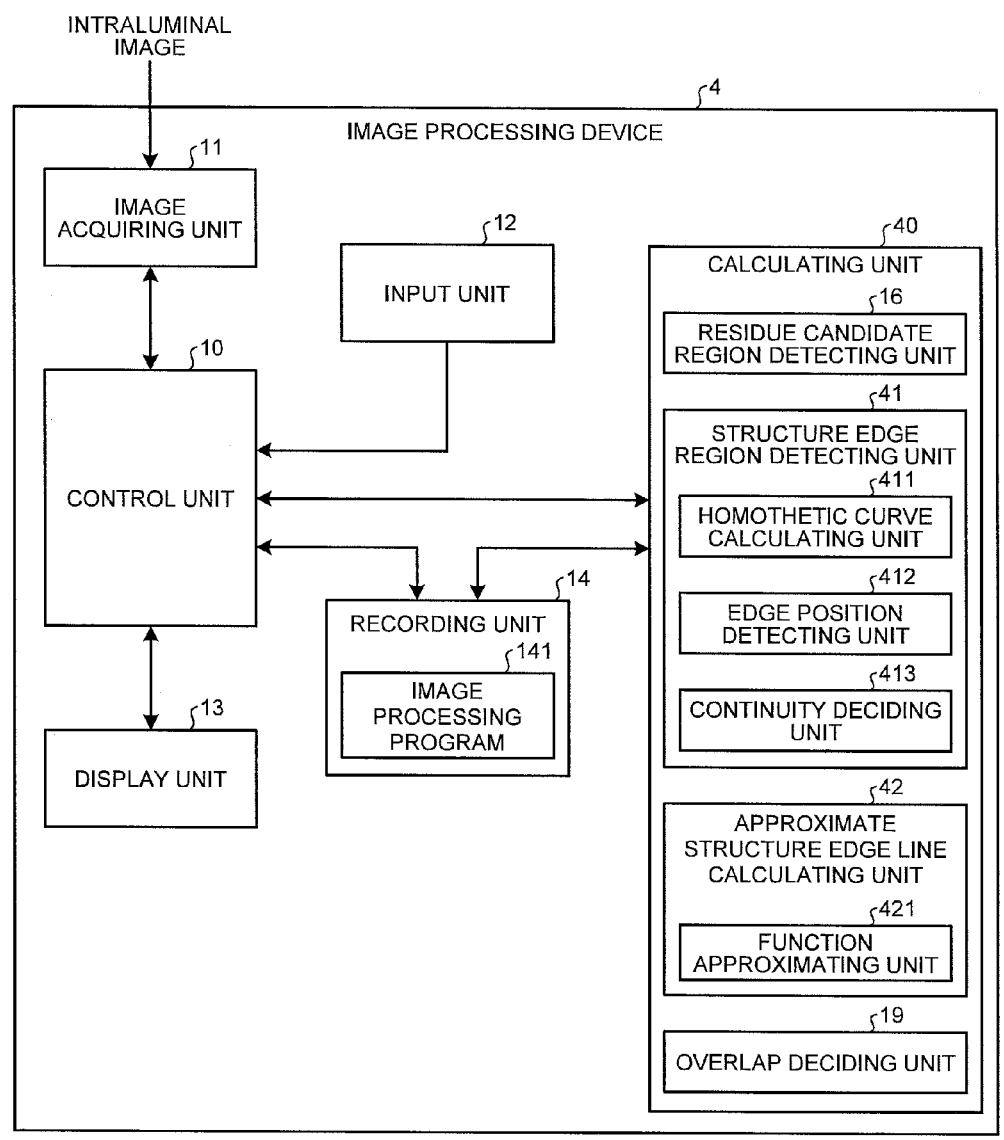
FIG. 13 is a block diagram illustrating a configuration of an image processing device according to a fourth embodiment of the invention.

Next, an image processing device according to a fourth embodiment is explained. As illustrated in FIG. 13, an image processing device 4 according to the fourth embodiment includes a calculating unit 40. Other configurations are similar to those illustrated in FIG. 1.

The calculating unit 40 includes the residue candidate region detecting unit 16, a structure edge region detecting unit 41, and an approximate structure edge line calculating unit 42 and the overlap deciding unit 19 as a residue region discriminating unit. Among these units, operations of the residue candidate region detecting unit 16 and the overlap deciding unit 19 are similar to those explained in the first embodiment.

The structure edge region detecting unit 41 includes a homothetic curve calculating unit 411 that calculates, for each distance from an outline of a residue candidate region, plural homothetic curves (hereinafter, "peripheral homothetic curve") each formed of pixels at equal distances from the outline of the residue candidate region and having a shape similar to that of the residue candidate region around the residue candidate region (a part of a region of the intraluminal image that surrounds the residue candidate region), an edge position detecting unit 412 that extracts edge coordinates as coordinates of a position where each peripheral homothetic curve overlaps an edge, and a continuity deciding unit 413 that decides continuity of edge coordinates between the peripheral homothetic curves, and detects a structure edge region around the residue candidate region.

The approximate structure edge line calculating unit 42 includes a function approximating unit 421 that calculates an approximate structure edge line by a function approximating method, extracts edge coordinates that are decided to be continuous between peripheral homothetic curves, and calculates an approximate structure edge line on the basis of these edge coordinates.

Figure 14:
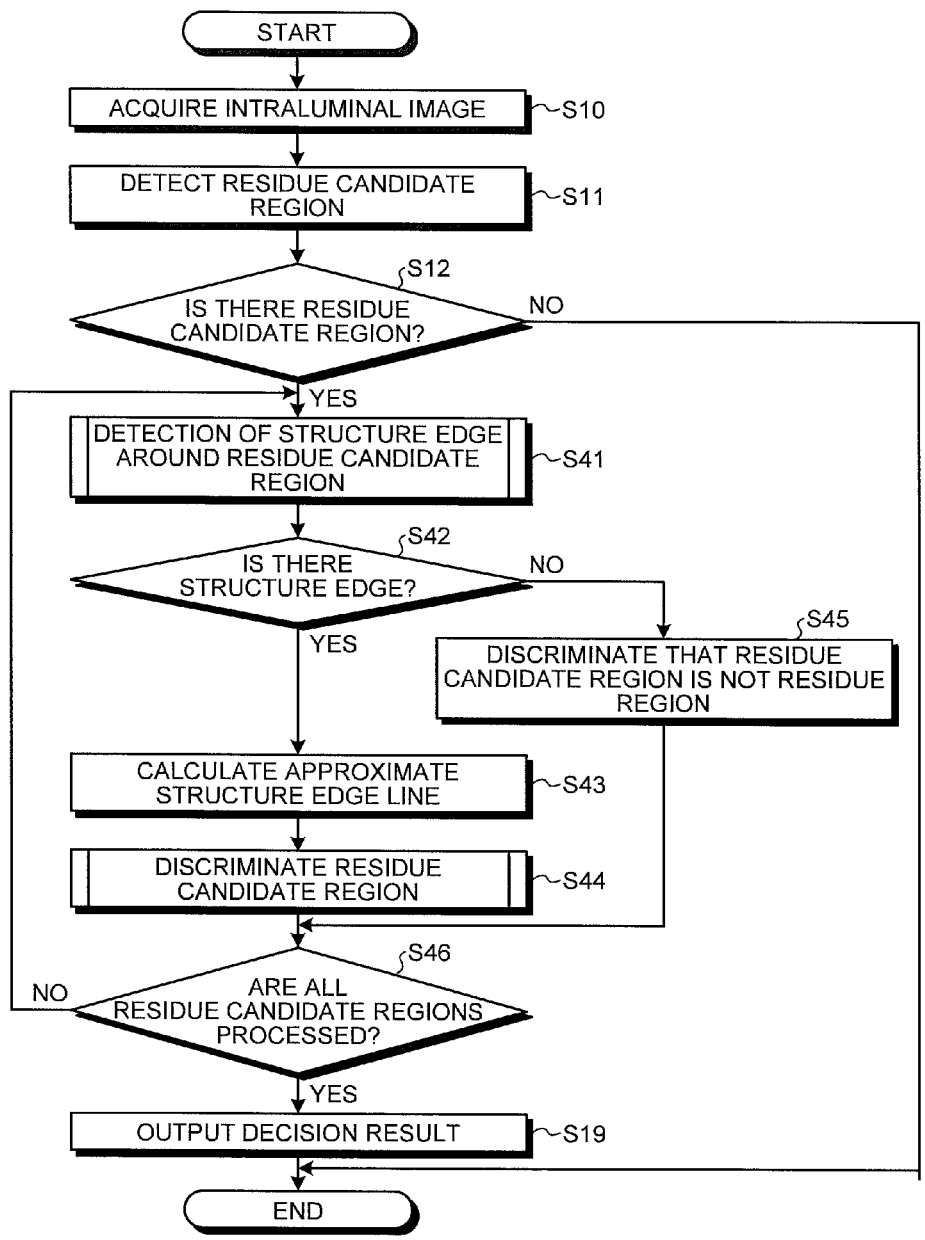
FIG. 14 is a flowchart illustrating an operation of the image processing device illustrated in FIG. 13.
Figure 15:
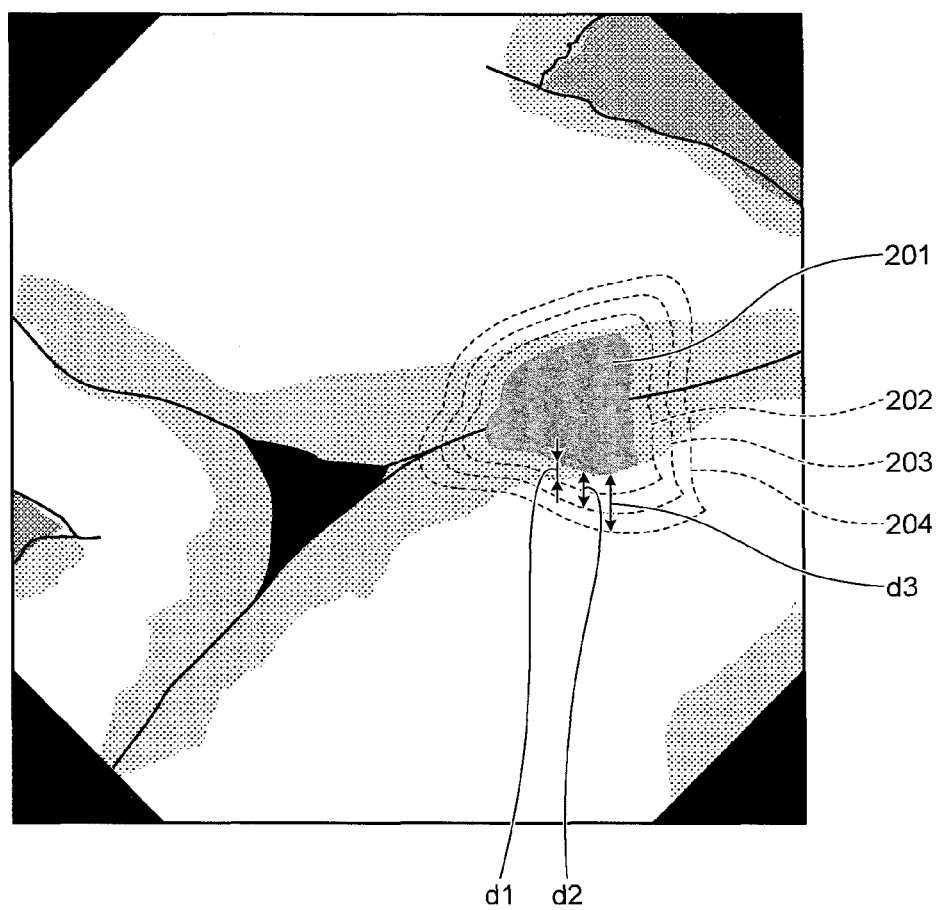
FIG. 15 is a schematic diagram illustrating an example of an intraluminal image as an object to be processed.

An operation of the image processing device 4 is explained next. FIG. 14 is a flowchart illustrating the operation of the image processing device 4. Operations at Steps S10 to S12 and S19 illustrated in FIG. 14 are similar to those explained in the first embodiment. FIG. 15 is a schematic diagram illustrating an example of an intraluminal image that is processed by the image processing device 4. A residue candidate region 201 detected at Step S11 is shown in an intraluminal image 200 illustrated in FIG. 15.

At Step S41, the structure edge region detecting unit 41 detects a structure edge around the residue candidate region 201.

Figure 16:
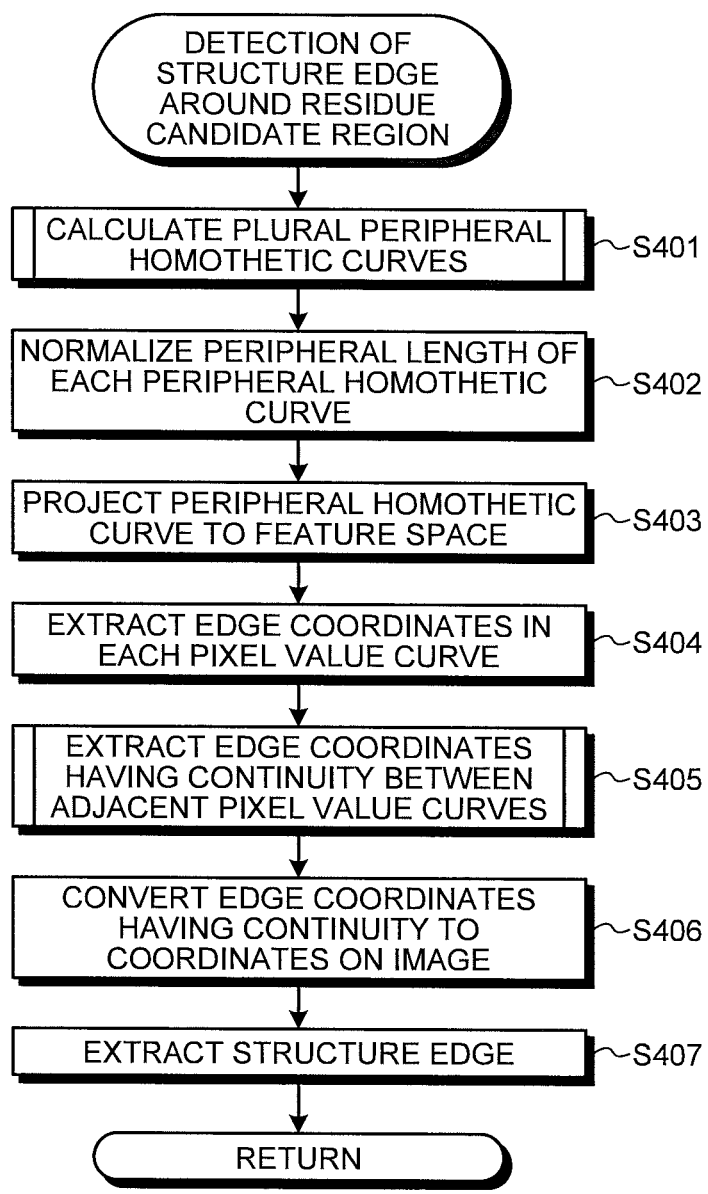
FIG. 16 is a flowchart illustrating a detection process of a structure edge around a residue candidate region that the image processing device illustrated in FIG. 13 performs.

FIG. 16 is a flowchart illustrating an operation of the structure edge region detecting unit 41 at Step S41.

First, at Step S401, the homothetic curve calculating unit 411 calculates plural peripheral homothetic curves of which distances from the residue candidate region 201 are different from each other. Peripheral homothetic curves 202 to 204 illustrated in FIG. 15 are peripheral homothetic curves at positions at distances of d1 to d3 from the outline of the residue candidate region 201, respectively.

Peripheral lengths of the peripheral homothetic curves 202 to 204 are mutually different. At Step S402, the homothetic curve calculating unit 411 sets a length of a first peripheral homothetic curve (the peripheral homothetic curve 202 in FIG. 15) of which a distance from the residue candidate region 201 is shortest, as a base length, and normalizes peripheral lengths of second and subsequent peripheral homothetic curves (the peripheral homothetic curves 203, 204 in FIG. 15) of which distances from the residue candidate region 201 is larger than the base length, on the basis of a ratio of each length to the base length. With this arrangement, the peripheral lengths of the peripheral homothetic curves 202 to 204 are standardized.

Figure 17:
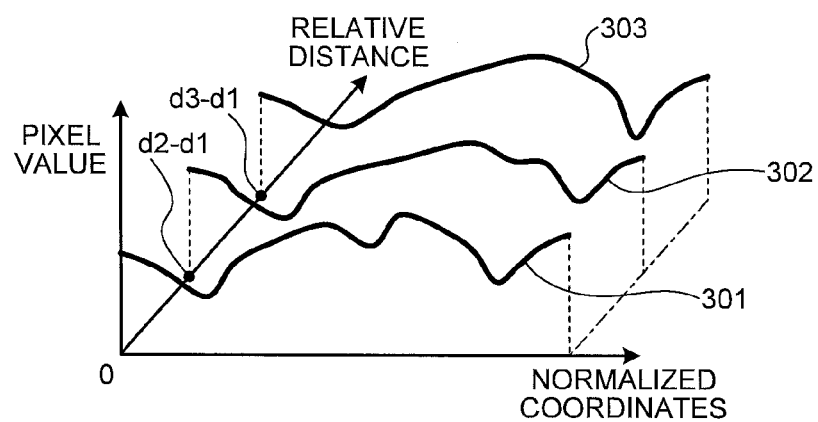
FIG. 17 is a schematic diagram illustrating a feature space obtained by projecting a normalized peripheral homothetic curve.

At Step S403, the homothetic curve calculating unit 411 projects the normalized peripheral homothetic curves 202 to 204 to a feature space illustrated in FIG. 17. The feature space illustrated in FIG. 17 is configured by three axes of normalized coordinates that express a position on a peripheral homothetic curve (a distance from a predetermined base position), relative distances of the other peripheral homothetic curves 203, 204 relative to the peripheral homothetic curve 202 that is set as the base, and pixel values of pixels on the peripheral homothetic curves 202 to 204. Pixel value curves 301 to 303 that express pixel vales of normalized coordinates within the feature space illustrated in FIG. 17 correspond to the peripheral homothetic curves 202 to 204 on the intraluminal image 200.

At Step S404, the edge position detecting unit 412 calculates differential strengths of the pixel value curves 301 to 303, and extracts normalized coordinates of which a differential strength is equal to or higher than a predetermined threshold value. For example, in the case of a feature space illustrated in FIG. 18, edge coordinates a1, b1, c1 are extracted from the first pixel value curve 301, edge coordinates a2, c2 are extracted from the second pixel value curve 302, and edge coordinates a3, c3 are extracted from the third pixel value curve 303.

At Step S405, the continuity deciding unit 413 decides whether there is continuity between adjacent pixel value curves for the detected edge coordinates a1 to a3, b1, c1 to c3, and extracts edge coordinates having continuity. The continuity deciding unit 413 performs this decision of continuity by searching whether other coordinates on a pixel value curve is present within a predetermined search range Δs, in the coordinates a1 on the pixel value curve 301, for example. This decision process of continuity is described in detail later. It is assumed here that the edge coordinates a1 to a3 and the edge coordinates c1 to c3 are extracted as edge coordinates having continuity.

Figure 19:
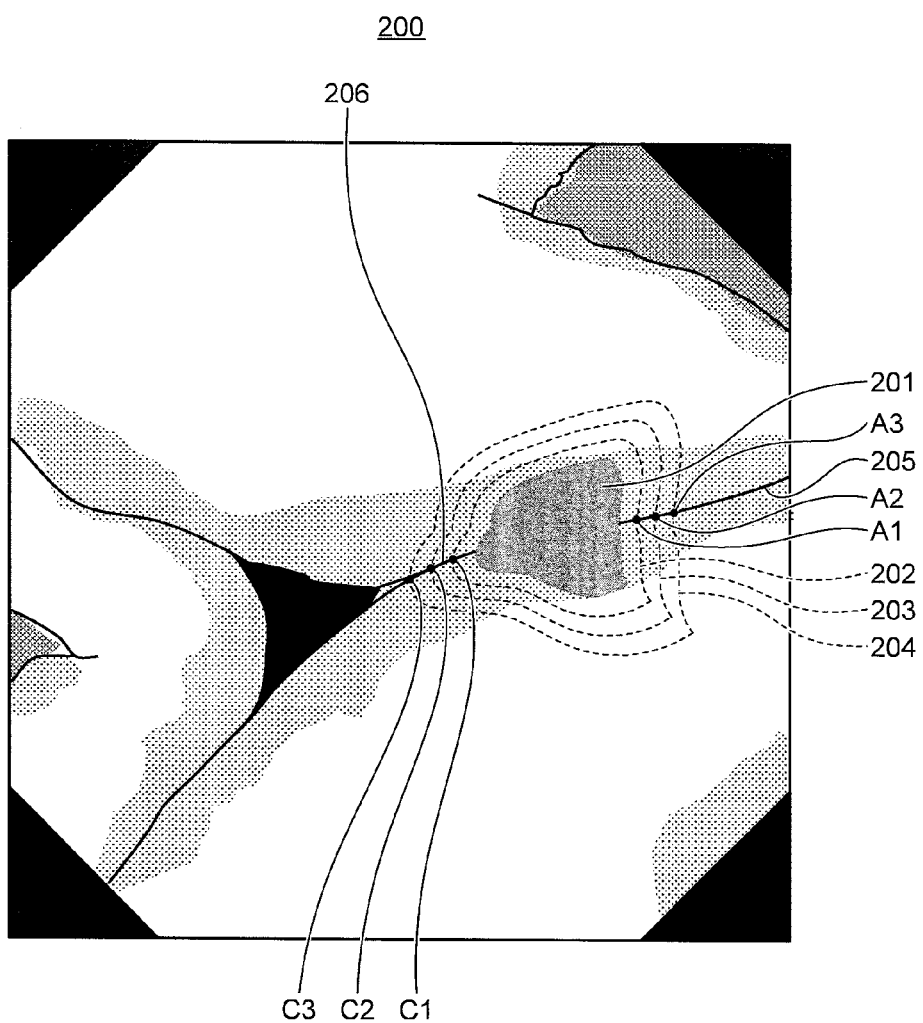
FIG. 19 is a schematic diagram illustrating an example that edge coordinates having continuity are converted to coordinates on an intraluminal image.

At Step S406, the continuity deciding unit 413 converts the extracted edge coordinates a1 to a3 and c1 to c3 to coordinates on an actual image space. As a result, as illustrated in FIG. 19, coordinates A1 to A3 corresponding to the edge coordinates a1 to a3, and coordinates C1 to C3 corresponding to the edge coordinates c1 to c3 are obtained.

Further, at Step S407, the structure edge region detecting unit 41 extracts arbitrary number of coordinates from the coordinates A1 to A3 and C1 to C3, respectively, and extracts a straight line or a curve that passes the extracted coordinates, as structure edges 205, 206. Thereafter, the operation returns to a main routine.

When a structure edge is detected as a result of this process (Yes at Step S42), the approximate structure edge line calculating unit 42 calculates an approximate structure edge line that is approximate to the detected structure edges 205, 206, by a function approximating method, for example (Step S43).

At Step S44, the overlap deciding unit 19 decides whether the calculated approximate structure edge line overlaps the residue candidate region 201, and discriminates whether the residue candidate region 201 is a residue region, on the basis of a result of the decision. A discrimination method of the residue candidate region 201 is similar to that explained in the first embodiment. Alternatively, the overlap deciding unit 19 can discriminate the residue candidate region 201 on the basis of an overlap relationship between the approximate structure edge line and the outline of the residue candidate region 201 in a similar manner to that in the second or third embodiment.

When a structure edge is not detected at Step S42 (No at Step S42), the overlap deciding unit 19 discriminates that the residue candidate region 201 is not a residue region (Step S45).

Thereafter, when a residue candidate region that is not performed with a discrimination process is still present (No at Step S46), the operation shifts to Step S41, and a process to the next residue candidate region is performed. On the other hand, when a discrimination process to all residue candidate regions that are detected from the intraluminal image 200 ends (Yes at Step S46), the operation shifts to Step S19.

Figure 20:
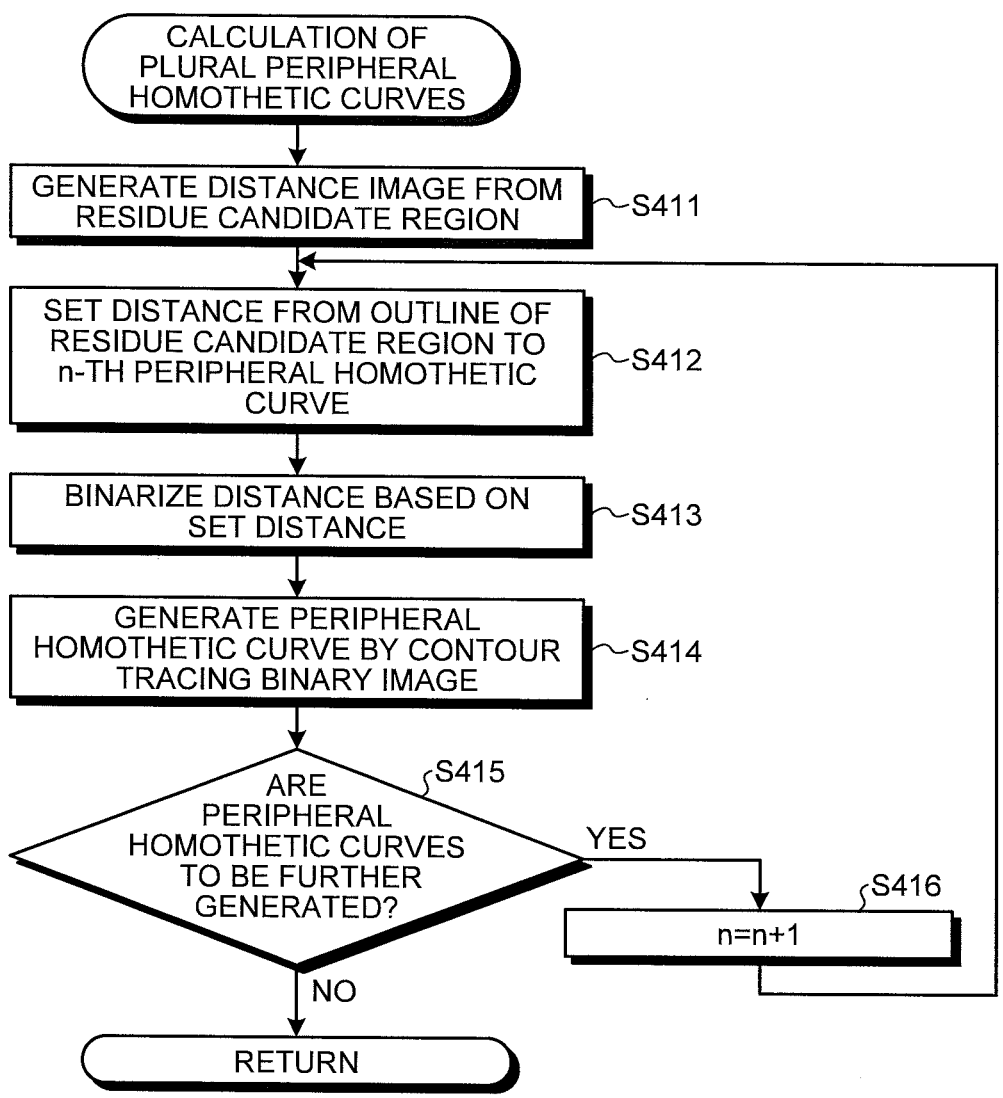
FIG. 20 is a flowchart illustrating a calculation process of plural peripheral homothetic curves that a homothetic curve calculation unit illustrated in FIG. 13 performs.

Next, a calculation process of plural peripheral homothetic curves described at Step S401 in FIG. 16 is explained in detail with reference to FIG. 20. FIG. 20 is a flowchart illustrating an operation of the homothetic curve calculating unit 411 at Step S401.

First, at Step S411, the homothetic curve calculating unit 411 generates a distance image by converting a value of each pixel within the intraluminal image 200 to a value that indicates a distance from the residue candidate region 201. As a generation method of a distance image, various known methods can be used (for example, see "An Algorithm for Euclidean Distance Transformation", Tomio Hirata, Toshihiro Kato, (Information Processing Society of Japan, IPSJ SIG Notes Vol. 94, No. 82, pp. 25-31, Sep. 21, 1994)).

At the next Step S412, the homothetic curve calculating unit 411 sets a distance $d_n$ from an outline of the residue candidate region 201 to an n-th peripheral homothetic curve. In this case, n (n=1, 2, 3, . . . ) denotes a number that identifies each peripheral homothetic curve. The distance $d_n$ can be set by a known method. For example, the distance $d_n$ can be set by determining an interval Δd between adjacent peripheral homothetic curves in advance, and multiplying the number n by the interval Δd.

At Step S413, the homothetic curve calculating unit 411 binarizes a distance image by using the set distance $d_n$ as a threshold value. The homothetic curve calculating unit 411 performs contour tracing with respect to a region of which a distance from the outline of the residue candidate region 201 is equal to or larger than $d_n$, and sequentially acquires pixel values of pixels on the outline of the region of which a distance from the outline of the residue candidate region 201 is equal to or smaller than a threshold value (the distance $d_n$). With this arrangement, a peripheral homothetic curve is generated (Step S414).

In the case of further generating peripheral homothetic curves of which distances from the outline of the residue candidate region 201 are different (Yes at Step S415), the homothetic curve calculating unit 411 increments the number n (n=n+1). Thereafter, the operation shifts to Step S412. When a desired number of peripheral homothetic curves are generated (No at Step S415), the operation returns to a main routine.

Figure 21:
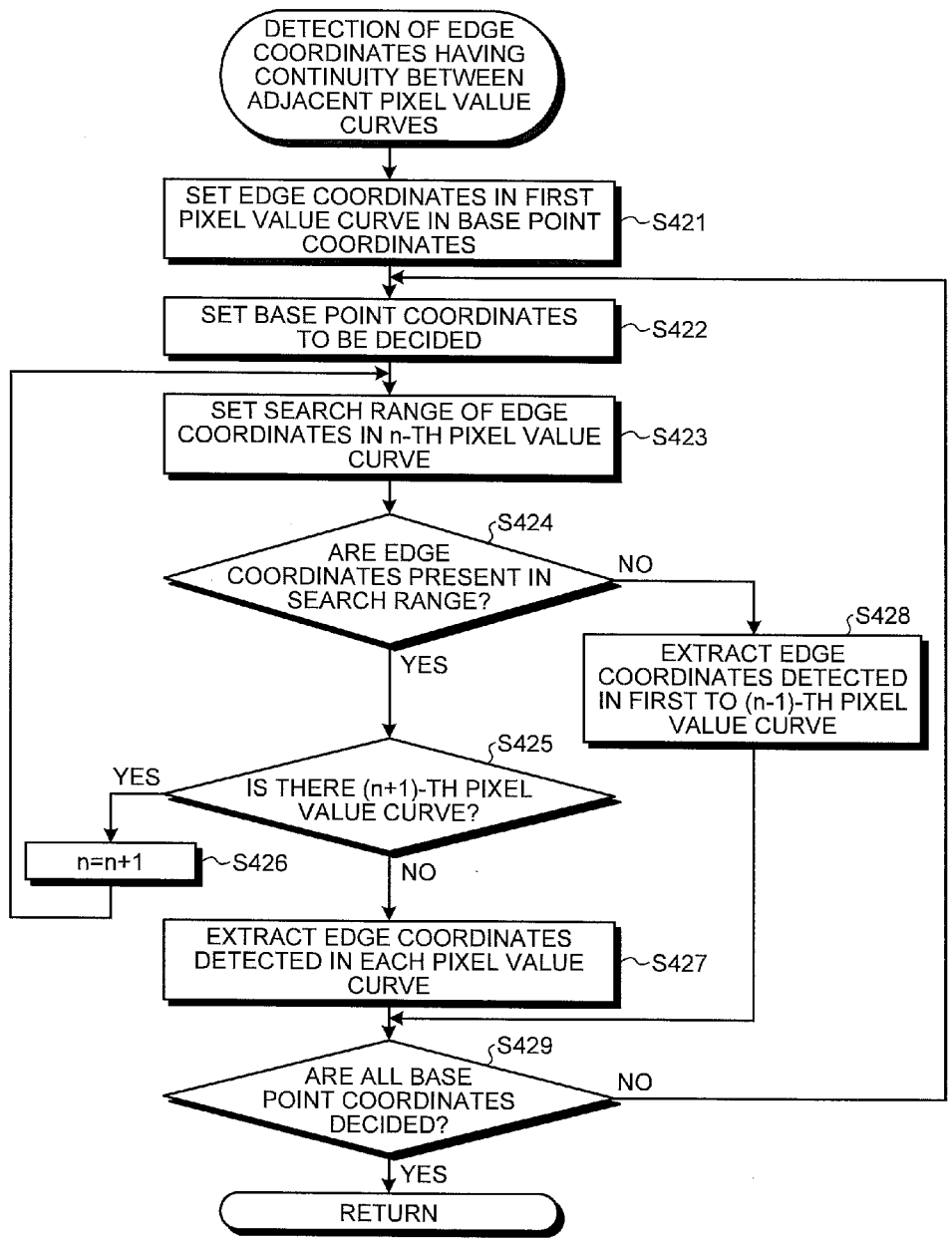
FIG. 21 is a flowchart illustrating a detection process of edge coordinates having continuity that a continuity deciding unit illustrated in FIG. 13 performs.

Next, a process of detecting edge coordinates that have continuity between adjacent pixel value curves described at Step S405 in FIG. 16 is explained in detail with reference to FIG. 21. FIG. 21 is a flowchart illustrating an operation of the continuity deciding unit 413 at Step S405.

First, at Step S421, the continuity deciding unit 413 sets edge coordinates that are detected from the first pixel value curve as base point coordinates. For example, in the case of FIG. 18, the edge coordinates a1, b1, c1 of the pixel value curve 301 are set as base point coordinates.

Next, the continuity deciding unit 413 sets base point coordinates of which continuity is to be decided (Step S422). Hereinafter, continuity is decided starting from the base point coordinates (edge coordinates) a1.

At Step S423, the continuity deciding unit 413 sets a search range for searching edge coordinates that are continuous from the base point coordinates in an n-th (n=2, 3, . . . ) pixel value curve. As the search range, an arbitrary width around the base point coordinates in the first pixel value curve is set. Alternatively, as the search range, an arbitrary width around edge coordinates detected when searching one inside ((n−1)-th) pixel value curve can be set. For example when n=3, a search range Δs around the base point coordinates a1 can be searched, or a search range Δs' around the edge coordinates a2 detected when searching the pixel value curve 302 can be searched.

At Step S424, the continuity deciding unit 413 decides whether edge coordinates are present within a search range of the n-th pixel value curve. When edge coordinates are present as a result (Yes at Step S424), and also when an outside ((n+1)-th) pixel value curve is present (Yes at Step S425), the number n is incremented (n=n+1, Step S426). Thereafter, the operation shifts to Step S423, and a search is performed to one outside pixel value curve. For example, in the case of FIG. 18, when the edge coordinates a2 are detected from the search range Δs of the second pixel value curve 302, a search is performed to the third pixel value curve 303.

After a search of edge coordinates in the outermost pixel value curve ends (No at Step S425), the continuity deciding unit 413 extracts edge coordinates detected in each pixel value curve, as edge coordinates having continuity (Step S427). For example, the edge coordinates a2 and a3 are extracted, for the base point coordinates a1.

On the other hand, when edge coordinates are not present in the search range as a result of searching the n-th pixel value curve (No at Step S424), edge coordinates that are detected in the first to an (n−1)-th pixel value curves are extracted as continuous edge coordinates (Step S428).

Thereafter, when there are still base point coordinates for which continuity of edge coordinates is not yet decided (No at Step S429), the operation shifts to Step S422, and a process is performed to other base point coordinates. On the other hand, when continuity of edge coordinates is decided for all base point coordinates (Yes at Step S429), the operation returns to a main routine.

Figure 18:
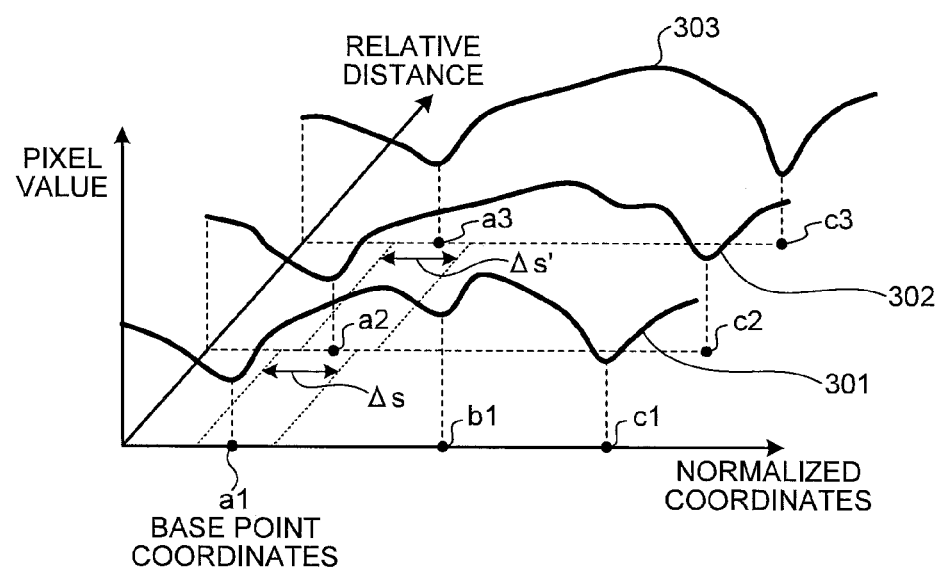
FIG. 18 is a view explaining a method of deciding continuity of edge coordinates extracted in the feature space.

As a result of this search process, the edge coordinates a1 to a3 and the edge coordinates c1 to c3 are extracted as continuous coordinates, in a feature space illustrated in FIG. 18.

As explained above, in the fourth embodiment, because a structure edge around each residue candidate region is detected, a residue candidate region can be efficiently discriminated by reducing an amount of calculation to detect a structure edge.

Modification 4-1

Figure 22:
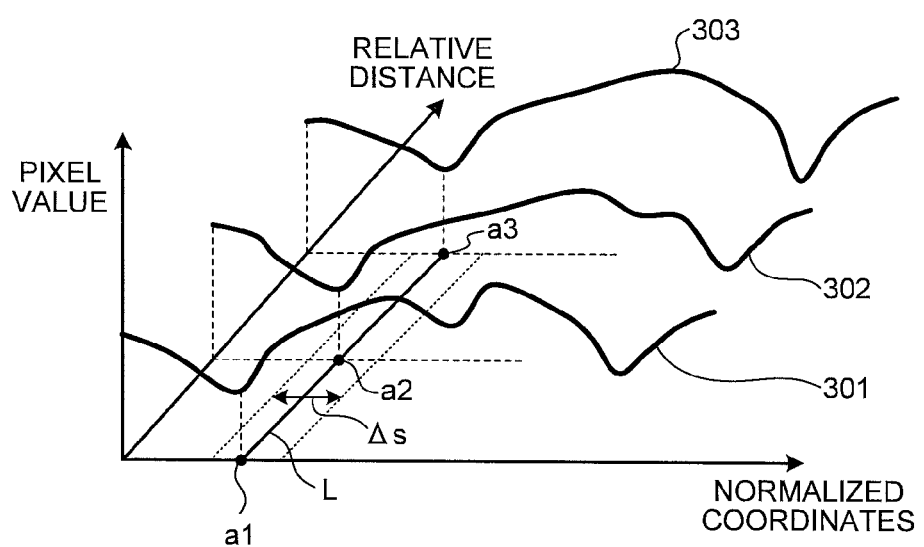
FIG. 22 is a view explaining a modification example of a search range that is set in a detection process of edge coordinates having continuity.

A setting method of a search range when detecting edge coordinates having continuity between pixel value curves is not limited to the above-described method. For example, as illustrated in FIG. 22, an approximate line L in a two-dimensional space of normalized coordinates and relative distance is calculated from the edge coordinates a1, a2 that are decided to be continuous by the inside pixel value curves 301, 302, and a periphery of the approximate line L can be set as the search range Δs.

Modification 4-2

A setting method of a search range when detecting edge coordinates having continuity between pixel value curves is not limited to the above-described method. For example, all peripheral homothetic curves are imaged, and continuity of edges can be discriminated on the basis of an edge feature data on an image. Specifically, an image is generated by using a number n of a peripheral homothetic curve as a vertical axis, using normalized coordinates as a lateral axis, and using a pixel value in the peripheral homothetic curve as density. A binary image is generated by binarizing a differential strength of each pixel that constitutes the image by threshold-processing the differential strength. Further, this binary image is labeled. When a main axis length of a label region that is obtained by the labeling is equal to or larger than a predetermined threshold value, edge coordinates that belong to the label region are decided to be continuous.

Modification 4-3

As a method for detecting a local structure edge of a residue candidate region periphery is not limited to the above-described method using a peripheral homothetic curve. For example, a predetermined range of the residue candidate region periphery is set as a region in which a structure edge is to be detected, and a structure edge can be detected by performing a process similar to that in the first embodiment, to the inside of this region.

As explained above, according to the first to fourth embodiments and their modifications, a candidate region of a non-mucosal region is detected from an intraluminal image on the basis of a pixel value, and whether this candidate region is a mucosal region or not is discriminated on the basis of a relative positional relationship between a structure edge and the candidate region contained in the intraluminal image. Therefore, as compared with the case of using only color information, it becomes possible to discriminate between a mucosal region and a non-mucosal region in higher precision.

The above-described image processing devices according to the first to fourth embodiments can be realized by executing an image processing program recorded on a recording medium by a personal computer or a computer system such as a work station. Such a computer system can be also used by connecting the computer system to a device of other computer system or a server via a local area network, a wide area network (LAN/WAN), or a public line such as the Internet. In this case, the image processing devices according to the first to fourth embodiments can acquire image data of the intraluminal image via these networks, output an image-processed result to various devices (such as a viewer and a printer) that are connected via these networks, and store the image-processed result in a storage device (such as a recording medium and its reading device) that is connected via these networks.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An image processing device that discriminates between a mucosal region and a non-mucosal region that are contained in an intraluminal image, the image processing device comprising:
   a processor; and
   a memory storing computer readable instructions that, when executed by the processor, implement:
   a candidate region detecting unit that detects a candidate region to be discriminated whether the region is a mucosal region or not, on the basis of a feature data of each pixel that constitutes the intraluminal image;
   a structure edge region detecting unit that detects a structure edge contained in the intraluminal image; and
   a region discriminating unit that discriminates whether the candidate region is a mucosal region or not, on the basis of a relative positional relationship between the structure edge and the candidate region;
   wherein the region discriminating unit comprises:
   an approximate structure edge line calculating unit that calculates an approximate structure edge line as an approximate line of the structure edge; and
   an overlap deciding unit that decides whether the approximate structure edge line and the candidate region overlap; and
   the region discriminating unit discriminates whether the candidate region is a mucosal region on the basis of a result of a decision by the overlap deciding unit.

2. The image processing device according to claim 1, wherein the non-mucosal region is a residue region that overlaps the mucosal region.

3. The image processing device according to claim 1, wherein the candidate region detecting unit detects the candidate region on the basis of color feature data of the each pixel.

4. The image processing device according to claim 1, wherein the structure edge region detecting unit detects the structure edge by using one color component that is farthest from a light absorption zone in a lumen among a plurality of color components that constitute the intraluminal image.

5. The image processing device according to claim 1, wherein
   the structure edge region detecting unit comprises:

a first differential strength calculating unit that calculates a first differential strength of each pixel by using a first color component of the each pixel;

a second differential strength calculating unit that calculates a second differential strength of each pixel by using a second color component of the each pixel;

a normalizing unit that normalizes the second differential strength on the basis of a strength ratio between the first and second color components; and a threshold value processing unit that discriminates that the pixel indicates a structure edge, when the first differential strength and the normalized second differential strength are both equal to or larger than a predetermined threshold value.

6. The image processing device according to claim 1, wherein the structure edge detecting unit detects the structure edge in a peripheral region that surrounds the candidate region.

7. The image processing device according to claim 6, wherein
the structure edge region detecting unit comprises:
a homothetic curve calculating unit that calculates a plurality of homothetic curves, each homothetic curve formed of pixels at equal distances from an outline of the candidate region and having a shape similar to the outline of the candidate region, the homothetic curves having mutually different distances from the outline of the candidate region;
an edge position detecting unit that detects edge positions of the plurality of homothetic curves; and
a continuity deciding unit that decides continuity of edge coordinates between adjacent homothetic curves among the plurality of homothetic curves.

8. The image processing device according to claim 1, wherein the approximate structure edge line calculating unit labels a plurality of the structure edges detected near the candidate region, and calculates an approximate structure edge line for each of the labeled structure edges.

9. The image processing device according to claim 1, wherein the approximate structure edge line calculating unit comprises a function approximating unit that function approximates the structure edge.

10. The image processing device according to claim 9, wherein the function approximating unit calculates a vector that is orthogonal to a gradient direction of a pixel value of a pixel that is positioned on the structure edge, and performs a function approximation on the basis of the vector.

11. The image processing device according to claim 9, wherein the function approximating unit calculates an eigenvector of a Hessian matrix on the basis of a pixel value of a pixel that is positioned on the structure edge, and performs a function approximation on the basis of the eigenvector.

12. The image processing device according to claim 9, wherein the function approximating unit performs a function approximation on the basis of coordinates of a pixel that is positioned on the structure edge.

13. The image processing device according to claim 1, wherein the overlap deciding unit performs a decision on the basis of an angle formed by a normal line of the outline and the approximate structure edge line, at a position where coordinates of the approximate structure edge line and coordinates of the candidate region match.

14. The image processing device according to claim 1, wherein the region discriminating unit further comprises a similarity calculating unit that calculates a similarity between an outline of the candidate region and the approximate structure edge line, and discriminates whether the candidate region is a mucosal region, on the basis of the similarity.

15. An image processing method for discriminating between a mucosal region and a non-mucosal region that are contained in an intraluminal image, the image processing method comprising:
candidate region detecting to detect a candidate region to be discriminated whether the region is a mucosal region or not, on the basis of a feature data of each pixel in the intraluminal image;
structure edge detecting to detect a structure edge contained in the intraluminal image; and
region discriminating to discriminate whether the candidate region is a mucosal region or not, on the basis of a relative positional relationship between the structure edge and the candidate region;
wherein the region discriminating comprises:
calculating an approximate structure edge line as an approximate line of the structure edge; and
deciding whether the approximate structure edge line and the candidate region overlap; and
the region discriminating discriminates whether the candidate region is a mucosal region on the basis of a result of a decision by the overlap deciding.

16. A computer-readable recording device with an executable program stored thereon, wherein the program instructs a processor to perform:
candidate region detecting to detect a candidate region to be discriminated whether the region is a mucosal region or not, on the basis of a feature data of each pixel in the intraluminal image;
structure edge detecting to detect a structure edge contained in the intraluminal image; and
region discriminating to discriminate whether the candidate region is a mucosal region or not, on the basis of a relative positional relationship between the structure edge and the candidate region;
wherein the region discriminating comprises:
calculating an approximate structure edge line as an approximate line of the structure edge; and
deciding whether the approximate structure edge line and the candidate region overlap; and
the region discriminating discriminates whether the candidate region is a mucosal region on the basis of a result of a decision by the overlap deciding.

17. An image processing device that discriminates between a mucosal region and a non-mucosal region that are contained in an intraluminal image, the image processing device comprising:
a candidate region detecting unit that detects a candidate region to be discriminated whether the region is a mucosal region or not, on the basis of a feature data of each pixel that constitutes the intraluminal image;
a structure edge region detecting unit that detects a structure edge contained in the intraluminal image; and
a region discriminating unit that discriminates whether the candidate region is a mucosal region or not, on the basis of a relative positional relationship between the structure edge and the candidate region;
wherein the region discriminating unit comprises:
an approximate structure edge line calculating unit that calculates an approximate structure edge line as an approximate line of the structure edge; and
an overlap deciding unit that decides whether the approximate structure edge line and the candidate region overlap; and the region discriminating unit discriminates whether the candidate region is a mucosal region on the basis of a result of a decision by the overlap deciding unit.

* * * * *